United States Patent
Cheng et al.

(10) Patent No.: US 11,647,010 B2
(45) Date of Patent: *May 9, 2023

(54) SINGLE SIGN-ON ACCESS TO CLOUD APPLICATIONS

(71) Applicant: Netskope, Inc., Santa Clara, CA (US)

(72) Inventors: Lebin Cheng, Saratoga, CA (US); Krishna Narayanaswamy, Saratoga, CA (US); Kartik Kumar Chatnalli Deshpande Sridhar, Sunnyvale, CA (US)

(73) Assignee: Netskope, Inc., Santa Clara, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 17/367,232

(22) Filed: Jul. 2, 2021

(65) Prior Publication Data
US 2021/0336946 A1 Oct. 28, 2021

Related U.S. Application Data

(63) Continuation of application No. 16/782,027, filed on Feb. 4, 2020, now Pat. No. 11,057,367, which is a
(Continued)

(51) Int. Cl.
*H04L 9/40* (2022.01)
*H04L 67/02* (2022.01)
(Continued)

(52) U.S. Cl.
CPC .......... *H04L 63/0815* (2013.01); *H04L 9/14* (2013.01); *H04L 9/30* (2013.01); *H04L 9/3226* (2013.01);
(Continued)

(58) Field of Classification Search
CPC ......... H04L 63/0815; H04L 9/14; H04L 9/30; H04L 9/3226; H04L 63/20
See application file for complete search history.

(56) References Cited

U.S. PATENT DOCUMENTS 7,272,646 B2  9/2007 Cooper et al.
7,475,146 B2  1/2009 Bazot et al.
(Continued)

FOREIGN PATENT DOCUMENTS

JP      2012168795 A    9/2012

OTHER PUBLICATIONS

PCT/US2017/060062—International Preliminary Report on Patentability, dated May 16, 2019, 9 pages.
(Continued)

*Primary Examiner* — J. Brant Murphy
*Assistant Examiner* — Stephen T Gundry

(57) ABSTRACT

The technology disclosed relates to non-intrusively enforcing security during federated single sign-on (SSO) authentication without modifying a trust relationship between a service provider (SP) and an identity provider (IDP). In particular, it relates to an assertion proxy receiving a verified assertion from an IDP obtained from an assertion that is generated when a user logs into a service provider (SP) and is verified in dependence upon the IDP's public key. It also relates to evaluating the verified assertion against one or more security policies. It further relates to forwarding the verified assertion evaluated to the SP and causing establishment of a single sign-on (SSO) authenticated session without modifying the assertion.

20 Claims, 14 Drawing Sheets

Related U.S. Application Data continuation of application No. 16/362,549, filed on Mar. 22, 2019, now Pat. No. 10,659,450, which is a continuation of application No. 15/795,957, filed on Oct. 27, 2017, now Pat. No. 10,243,946.

(60) Provisional application No. 62/417,939, filed on Nov. 4, 2016.

(51) Int. Cl.
| | |
|---|---|
| *H04L 9/32* | (2006.01) |
| *H04L 67/10* | (2022.01) |
| *H04L 67/56* | (2022.01) |
| *H04L 9/14* | (2006.01) |
| *H04L 9/30* | (2006.01) |

(52) U.S. Cl.
CPC .......... *H04L 9/3247* (2013.01); *H04L 9/3265* (2013.01); *H04L 67/02* (2013.01); *H04L 67/10* (2013.01); *H04L 67/56* (2022.05); *H04L 63/0281* (2013.01); *H04L 63/0442* (2013.01); *H04L 63/0464* (2013.01); *H04L 63/0823* (2013.01)

(56) References Cited

U.S. PATENT DOCUMENTS

| | | |
|---|---|---|
| 7,478,434 B1 | 1/2009 | Hinton et al. |
| 7,587,499 B1 | 9/2009 | Haghpassand |
| 7,657,639 B2 | 2/2010 | Hinton |
| 7,698,375 B2 | 4/2010 | Hinton et al. |
| 7,860,883 B2 | 12/2010 | Hinton et al. |
| 8,151,317 B2 | 4/2012 | Hinton et al. |
| 8,196,177 B2 | 6/2012 | Hinton, I |
| 8,275,985 B1 | 9/2012 | Narayanan et al. |
| 8,280,986 B2 | 10/2012 | Deprun |
| 8,543,810 B1 | 9/2013 | Angal et al. |
| 8,572,757 B1 | 10/2013 | Stamos et al. |
| 8,707,409 B2 | 4/2014 | Shah et al. |
| 8,856,869 B1 | 10/2014 | Brinskelle |
| 8,914,461 B2 | 12/2014 | Murai |
| 9,137,131 B1 | 9/2015 | Sarukkai et al. |
| 9,237,142 B2 | 1/2016 | Cha et al. |
| 9,246,907 B2 | 1/2016 | Canning et al. |
| 9,270,765 B2 | 2/2016 | Narayanaswamy et al. |
| 9,276,869 B2 | 3/2016 | Dodd et al. |
| 9,565,202 B1 | 2/2017 | Kindlund et al. |
| 9,596,123 B2 | 3/2017 | Hinton et al. |
| 9,690,920 B2 | 6/2017 | Marcus et al. |
| 9,807,087 B2 | 10/2017 | Hinton et al. |
| 9,836,702 B2 | 12/2017 | Hinton |
| 10,063,539 B2 | 8/2018 | Hinton et al. |
| 10,255,061 B2 * | 4/2019 | Lander ................. H04L 45/02 |
| 10,305,882 B2 * | 5/2019 | Hinton ................ H04L 63/0815 |
| 10,341,410 B2 * | 7/2019 | Lander ................ H04L 67/56 |
| 10,425,386 B2 * | 9/2019 | Wardell ................ H04L 67/563 |
| 10,445,395 B2 * | 10/2019 | Carru ..................... H04L 67/53 |
| 10,484,382 B2 * | 11/2019 | Wilson ................ H04L 63/0815 |
| 10,511,589 B2 * | 12/2019 | Gangawane ............ H04L 63/10 |
| 10,516,672 B2 * | 12/2019 | Gupta .................... H04L 63/102 |
| 10,594,684 B2 * | 3/2020 | Bansal .................. G06F 9/4881 |
| 10,616,224 B2 * | 4/2020 | Subramanian ........ G06F 9/5072 |
| 10,735,394 B2 * | 8/2020 | Gupta ................ H04L 63/0815 |
| 2001/0011238 A1 | 8/2001 | Eberhard et al. |
| 2001/0054157 A1 | 12/2001 | Fukumoto |
| 2002/0016773 A1 | 2/2002 | Ohkuma et al. |
| 2003/0135465 A1 | 7/2003 | Lee et al. |
| 2004/0205360 A1 | 10/2004 | Norton et al. |
| 2005/0086197 A1 | 4/2005 | Boubez et al. |
| 2006/0020679 A1 | 1/2006 | Hinton et al. |
| 2006/0021017 A1 | 1/2006 | Hinton et al. |
| 2006/0021018 A1 | 1/2006 | Hinton et al. |
| 2006/0048216 A1 | 3/2006 | Hinton et al. |
| 2006/0075481 A1 | 4/2006 | Ross et al. |
| 2006/0136990 A1 | 6/2006 | Hinton et al. |
| 2006/0218628 A1 | 9/2006 | Hinton et al. |
| 2006/0236382 A1 | 10/2006 | Hinton et al. |
| 2007/0006293 A1 | 1/2007 | Balakrishnan et al. |
| 2007/0289006 A1 | 12/2007 | Ramachandran et al. |
| 2008/0010288 A1 | 1/2008 | Hinton et al. |
| 2008/0010665 A1 | 1/2008 | Hinton et al. |
| 2008/0021866 A1 | 1/2008 | Hinton et al. |
| 2008/0021997 A1 | 1/2008 | Hinton |
| 2008/0059804 A1 | 3/2008 | Shah et al. |
| 2008/0229428 A1 | 9/2008 | Camiel |
| 2008/0320576 A1 | 12/2008 | Curling |
| 2009/0022319 A1 | 1/2009 | Shahaf et al. |
| 2009/0044260 A1 | 2/2009 | Niglio et al. |
| 2010/0024008 A1 | 1/2010 | Hopen et al. |
| 2010/0100924 A1 | 4/2010 | Hinton |
| 2010/0100925 A1 | 4/2010 | Hinton |
| 2011/0016197 A1 | 1/2011 | Shiimori et al. |
| 2011/0196914 A1 | 8/2011 | Tribbett |
| 2011/0247045 A1 | 10/2011 | Rajagopal et al. |
| 2011/0264906 A1 | 10/2011 | Pourzandi et al. |
| 2011/0277027 A1 | 11/2011 | Hayton et al. |
| 2012/0023323 A1 | 1/2012 | Kent, Jr. et al. |
| 2012/0023565 A1 | 1/2012 | Tumanyan |
| 2012/0106366 A1 | 5/2012 | Gauvin |
| 2012/0144034 A1 | 6/2012 | McCarty |
| 2012/0144189 A1 | 6/2012 | Zhong |
| 2012/0151551 A1 | 6/2012 | Readshaw et al. |
| 2012/0204260 A1 | 8/2012 | Cecil et al. |
| 2012/0237908 A1 | 9/2012 | Fitzgerald et al. |
| 2012/0278487 A1 | 11/2012 | Woelfel |
| 2012/0278872 A1 | 11/2012 | Woelfel et al. |
| 2013/0006865 A1 | 1/2013 | Spates |
| 2013/0055342 A1 | 2/2013 | Choi et al. |
| 2013/0179573 A1 | 7/2013 | McCarty |
| 2013/0227099 A1 | 8/2013 | Hinton et al. |
| 2013/0227140 A1 | 8/2013 | Hinton et al. |
| 2014/0007222 A1 | 1/2014 | Qureshi et al. |
| 2014/0020078 A1 | 1/2014 | Canning et al. |
| 2014/0026182 A1 | 1/2014 | Pearl et al. |
| 2014/0032691 A1 | 1/2014 | Barton et al. |
| 2014/0068743 A1 | 3/2014 | Marcus et al. |
| 2014/0189123 A1 | 7/2014 | Dodd et al. |
| 2014/0230027 A1 | 8/2014 | Cha et al. |
| 2014/0259094 A1 | 9/2014 | Narayanaswamy et al. |
| 2014/0259190 A1 | 9/2014 | Kiang et al. |
| 2015/0019870 A1 | 1/2015 | Patnala et al. |
| 2015/0135302 A1 | 5/2015 | Cohen et al. |
| 2015/0254450 A1 | 9/2015 | Ravi et al. |
| 2015/0312227 A1 | 10/2015 | Follis et al. |
| 2016/0036855 A1 | 2/2016 | Gangadharappa et al. |
| 2016/0044124 A1 | 2/2016 | Sarukkai et al. |
| 2016/0094483 A1 | 3/2016 | Johnston et al. |
| 2016/0119327 A1 | 4/2016 | Canning et al. |
| 2016/0134619 A1 | 5/2016 | Mikheev et al. |
| 2016/0205067 A1 | 7/2016 | Cha et al. |
| 2017/0149767 A1 | 5/2017 | Hinton et al. |
| 2017/0149770 A1 | 5/2017 | Hinton et al. |
| 2017/0177855 A1 | 6/2017 | Costa Faidella et al. |
| 2017/0331791 A1 | 11/2017 | Wardell et al. |
| 2017/0331812 A1 | 11/2017 | Lander et al. |
| 2017/0331829 A1 | 11/2017 | Lander et al. |
| 2017/0339176 A1 | 11/2017 | Backer et al. |
| 2017/0353447 A1 | 12/2017 | Hinton et al. |
| 2018/0039494 A1 | 2/2018 | Lander et al. |
| 2018/0041336 A1 | 2/2018 | Keshava et al. |
| 2018/0041491 A1 | 2/2018 | Gupta et al. |
| 2018/0041515 A1 | 2/2018 | Gupta et al. |
| 2018/0063143 A1 | 3/2018 | Wilson et al. |
| 2018/0075231 A1 | 3/2018 | Subramanian et al. |
| 2018/0077138 A1 | 3/2018 | Bansal et al. |
| 2018/0077144 A1 | 3/2018 | Gangawane et al. |
| 2018/0081983 A1 | 3/2018 | Carru et al. |
| 2018/0083915 A1 * | 3/2018 | Medam .............. G06F 16/2246 |
| 2018/0083967 A1 | 3/2018 | Subramanian et al. |
| 2018/0302398 A1 * | 10/2018 | Hinton ................ H04L 63/0815 |
| 2019/0149592 A1 * | 5/2019 | Lander ................. H04L 67/56 |
| | | 726/4 |
| 2019/0155597 A1 * | 5/2019 | Lander .................... G06F 8/656 |

(56) References Cited

U.S. PATENT DOCUMENTS

| | | | | |
|---|---|---|---|---|
| 2019/0199707 A1* | 6/2019 | Hinton | ............... | H04L 63/0815 |
| 2019/0334884 A1 | 10/2019 | Ross et al. | | |
| 2019/0364020 A1* | 11/2019 | Wardell | ............. | H04L 41/0893 |
| 2019/0392017 A1* | 12/2019 | Carru | ................... | G06F 16/957 |
| 2020/0053087 A1* | 2/2020 | Wilson | ................... | H04L 63/10 |
| 2020/0076817 A1* | 3/2020 | Gupta | .................... | G06F 21/41 |
| 2020/0186515 A1* | 6/2020 | Bansal | ................. | G06F 9/5027 |
| 2020/0244638 A1* | 7/2020 | Gupta | ................ | H04L 63/0815 |

OTHER PUBLICATIONS

JP 2019-520017—Notice of Allowance dated Sep. 30, 2019, 7 pages.
U.S. Appl. No. 16/362,549—Office Action dated Sep. 20, 2019, 6 pages.
U.S. Appl. No. 16/362,549—Response to Office Action dated Sep. 20, 2019, filed Dec. 18, 2019, 11 pages.
U.S. Appl. No. 16/362,549—Notice of Allowance dated Jan. 15, 2020, 22 pages.
U.S. Appl. No. 15/795,957, filed Oct. 27, 2017, U.S. Pat. No. 10,243,946, Mar. 26, 2019, Issued.
U.S. Appl. No. 16/362,549, filed Mar. 22, 2019, U.S. Pat. No. 10,659,450, May 19, 2020, Issued.
U.S. Appl. No. 16/782,027, filed Feb. 4, 2020, U.S. Pat. No. 11,057,367, Jul. 6, 2021, Issued.
Cheng, Lebin, et al, "Cloud Security For Dummies", Netskope Special Edition 2015, 53 pages.
Maler, Eve, "SAML V2.0 Basics", May 2005, 37 pages.
Netscope, "Cloud Data Loss Prevention Reference Architecture", 2015, 2 pages.
Netscope, "Data Loss Prevention and Monitoring in the Cloud", Nov. 2014, 18 pages.
Netscope, "Netskope Active Cloud DLP", 2015, 4 pages.
Netscope, "Netskope Introspection", 2015, 3 pages.
Netscope, "Repave the Cloud Data Breach Collision Course", 2014, 6 pages.
Netscope, "The 15 Critical CASB Use Cases", 2016, 19 pages.
Netscope, "The 5 Steps to Cloud Confidence", 2014, 11 pages.
Netscope, "The Netskope Advantage: Three Must Have Requirements for Cloud Access Security Brokers", 2015, 4 pages.
Netscope, "The Netskope Platform Enabling Safe Migration to the Cloud", 2015, 6 pages.

SAML, "SAML Developer Tools", [retreived on Aug. 22, 2016]. Retreived from the Internet<URL: https://www.samltool.com/generic_sso_res.php>, 14 pages.
PCT/US2017/060062—International Search Report and Written Opinion dated Jan. 19, 2018, 12 pages.
PCT/US2014/21174—International Search Report and Written Opinion, dated Aug. 29, 2014, 13 pages.
U.S. Appl. No. 14/198,499—Office Action dated May 21, 2015, 19 pages.
EP 14761047.1—Extended Search Report dated Aug. 4, 2016, 7 pages.
U.S. Appl. No. 14/198,499—Response to Office Action dated May 21, 2015, filed Feb. 16, 2016, 8 pages.
U.S. Appl. No. 14/198,499—Notice of Allowance dated Mar. 22, 2016, 11 pages.
U.S. Appl. No. 14/198,508—Response to Office Action (Interview Summary) dated Jul. 31, 2015 filed Aug. 10, 2015, 9 pages.
U.S. Appl. No. 14/198,508—Office Action (Interview Summary) dated Jul. 31, 2015, 3 pages.
U.S. Appl. No. 14/198,508—Notice of Allowance dated Dec. 10, 2015, 14 pages.
PCT/US2014/21174—International Preliminary Report on Patentability, dated Sep. 8, 2015, 10 pages.
EP 14761047.1—Response to Extended Search Report dated Aug. 4, 2016 filed Feb. 28, 2017, 10 pages.
U.S. Appl. No. 15/213,250—Office Action dated Jan. 22, 2018, 25 pages.
U.S. Appl. No. 15/213,250—Response to Office Action dated Jan. 22, 2018, filed Feb. 14, 2018, 11 pages.
U.S. Appl. No. 151795,957—First Action Interview Pilot Program Pre-Interview Communication dated Aug. 16, 2018, 15 pages.
U.S. Appl. No. 151795,957—Notice of Allowance dated Nov. 2, 2018, 20 pages.
JP 2019-520017—Voluntary Amendments filed Jun. 6, 2019, 16 pages.
U.S. Appl. No. 16/782,027—First Action Interview Pilot Program Pre-Interview Communication dated Dec. 23, 2020, 6 pages.
U.S. Appl. No. 16/782,027—Response to First Action Interview Pilot Program Pre-Interview Communication dated Dec. 23, 2020, filed Jan. 25, 2021, 11 pages.
U.S. Appl. No. 16/782,027—Notice of Allowance dated Mar. 4, 2021, 30 pages.

* cited by examiner

SINGLE SIGN-ON ACCESS TO CLOUD APPLICATIONS

CROSS REFERENCE TO OTHER APPLICATIONS

This application is a continuation of U.S. patent application Ser. No. 16/782,027, entitled "ASSERTION PROXY FOR SINGLE SIGN-ON ACCESS TO CLOUD APPLICATIONS," filed on Feb. 4, 2020, which is a continuation of U.S. patent application Ser. No. 16/362,549, entitled "CLOUD PROXY FOR FEDERATED SINGLE SIGN-ON (SSO) FOR CLOUD SERVICES," filed on Mar. 22, 2019, which is a continuation of U.S. patent application Ser. No. 15/795,957, entitled "NON-INTRUSIVE SECURITY ENFORCEMENT FOR FEDERATED SINGLE SIGN-ON (SSO)", filed on Oct. 27, 2017, which claims priority to and the benefit of U.S. Provisional Application No. 62/417,939, entitled "NON-INTRUSIVE SECURITY ENFORCEMENT FOR CLOUD-BASED FEDERATED SINGLE SIGN-ON (SSO)", filed on Nov. 4, 2016. The priority applications are incorporated by reference for all purposes.

This application incorporates by reference U.S. Nonprovisional patent application Ser. No. 14/198,499, entitled "SECURITY FOR NETWORK DELIVERED SERVICES", filed on Mar. 5, 2014 (now U.S. Pat. No. 9,398,102 issued on Jul. 19, 2016);

This application incorporates by reference U.S. Nonprovisional patent application Ser. No. 14/835,640, entitled "SYSTEMS AND METHODS OF MONITORING AND CONTROLLING ENTERPRISE INFORMATION STORED ON A CLOUD COMPUTING SERVICE (CCS)", filed on Aug. 25, 2015; and This application incorporates by reference U.S. Provisional Patent Application No. 62/307,305, entitled "SYSTEMS AND METHODS OF ENFORCING MULTI-PART POLICIES ON DATA-DEFICIENT TRANSACTIONS OF CLOUD COMPUTING SERVICES", filed on Mar. 11, 2016.

FIELD OF THE TECHNOLOGY DISCLOSED

The technology disclosed relates generally to security for network delivered services, and in particular relates to non-intrusive security enforcement during federated single sign-on (SSO) by preserving a trust relationship between a service provider (SP) and an identity provider (IDP).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The technology disclosed relates to non-intrusively enforcing security during federated single sign-on (SSO) authentication without modifying a trust relationship between a service provider (SP) and an identity provider (IDP). In particular, it relates to configuring the IDP to use a proxy-URL for forwarding an assertion generated when a user logs into the SP, in place of an assertion consumer service (ACS)-URL of the SP. It also relates to configuring an assertion proxy, at the proxy-URL, to use the SP's ACS-URL for forwarding the assertion to the SP. It further relates to inserting the assertion proxy in between the user's client and an ACS of the SP by forwarding the assertion to the SP's ACS-URL to establish a federated SSO authenticated session through the inserted assertion proxy.

The explosive growth of cloud applications and, in particular, Software-as-a-Service (SaaS) applications has changed the way organizations do business. Lower maintenance costs, increased uptime, faster feature rollout, and the reduced need for on-site hardware are just some of the reasons why cloud-based SaaS solutions are making deep and fast inroads to tasks that were formerly dominated solely by in-house IT staff.

However, user identity management (UIM) on SaaS applications is difficult, time consuming, and expensive. To address the challenges and cost of UIM, many enterprises that subscribe to SaaS applications are turning to Identity-as-a-Service (IDaaS) solutions to easily create and manage user identities across their entire portfolio of SaaS application subscriptions, which usually span multiple platforms and can change often.

IDaaS solutions give users federated Single Sign-on (SSO) capability or federated identity across all of an organization's SaaS application subscriptions. SSO allows users of an organization to authenticate at a single location, with a single account, and access a broad range of SaaS applications. With SSO, a user does not need to be signed on several times to call various applications, and can reuse the authenticated status of a previous application in the same session. The benefit of using SSO is that it reduces human error and saves time spent in authenticating with different SaaS applications for the same identity. Numerous mechanisms implement SSO between an IDaaS provider and a plurality of SaaS applications. For example, SSO is facilitated by Security Assertion Markup Language (SAML). SAML is an extensible markup language (XML)-based open standard data format for communicating security information (authentication and authorization data) between an entity that provides user identities, i.e. an identity provider (e.g., IDaaS), and an entity that provides the service that the user needs to log in to, i.e. a service provider (e.g., SaaS application). Other examples of SSO implementation mechanisms include WS-Federation, OAuth, OpenID, LDAP, Kerberos, SecureID, Shibboleth System, eXtensible Access Control Markup Language (XACML), and Service Provisioning Markup Language (SPML).

Besides SSO, organizations have a requirement for monitoring, moderating, and curtailing access to the subscribed SaaS applications by way of a so-called cloud access security broker (CASB). However, most organizations cannot effectively use both an IDaaS solution to implement SSO, which requires establishment of a trust relationship between the IDaaS provider and the SaaS applications through direct communication, and a CASB server, which modifies the trust relationship by interrupting the direct communication required for SSO.

As SaaS adoption by the enterprise continues to grow, so does the need to monitor, moderate, and manage access to the SaaS applications. The limited capabilities of existing CASB servers would require the setup of an improved CASB server that enforces cloud security in a non-intrusive manner without modifying the trust relationship between an organization's IDaaS subscription and its SaaS application subscriptions.

Therefore, an opportunity arises for the development of an enhanced CASB to overcome the above mentioned limitations of existing CASBs.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
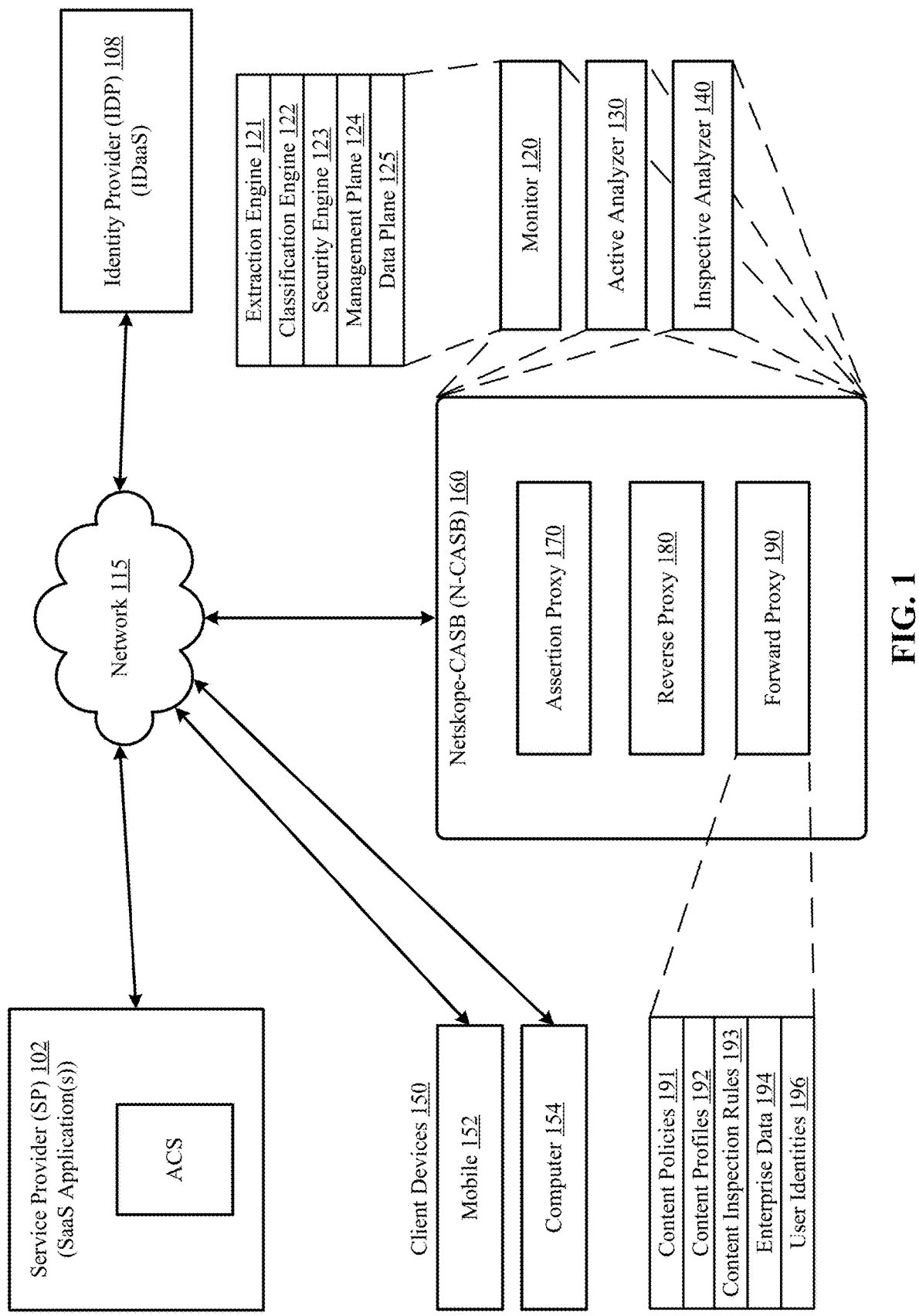
FIG. 1 shows an architectural level schematic of a system in accordance with an implementation of the technology disclosed.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The discussion is organized as follows. First, an explanation of terminology that is used throughout the discussion is provided. Then, an introduction describing some of the technical problems addressed by various implementations is presented. Next, a high-level description of one implementation is discussed at an architectural level. Lastly, more detailed architectures for implementing the system, together with the methods, are discussed.

Terminology

Service Provider (SP): As used herein, the application or website the user is trying to sign into is referred to as a "service provider". The SP is a Software-as-a-Service (SaaS) application such as Salesforce.com™, Box™, Dropbox™, Google Apps™, Amazon AWS™ Microsoft Office 365™, Workday™, Oracle on Demand™, Taleo™, Yammer™, and Concur™ The SP can be offered as a web-architected application or a cloud-delivered legacy service. The SP can also be operationalized as an on-premise service.

SaaS (Software-as-a-Service) Application: As used herein, the cloud-based SP or a hosted service or a cloud service or a cloud application or a cloud storage provider or a cloud storage application or a cloud computing service (CCS) is referred to as a "SaaS application", and vice-versa. Also as used herein, a cloud service, sometimes also referred to as a cloud computing service (CCS), or a hosted service or a cloud application refers to a network cloud service or application, web-based (e.g., accessed via a uniform resource locator (URL)) or native, such as sync clients. Examples include SaaS offerings, platform-as-a-service (PaaS) offerings, and infrastructure-as-a-service (IaaS) offerings, as well as internal enterprise applications that are exposed via URLs. Examples of common SaaS applications today include Salesforce.com™ Box™, Dropbox™, Google Apps™, Amazon AWS™, Microsoft Office 365™, Workday™ Oracle on Demand™, Taleo™, Yammer™, and Concur™. SaaS applications provide functionality to users that is implemented in the cloud and that is the target of policies, e.g., logging in, editing documents, downloading bulk data, reading customer contact information, entering payables, deleting documents, in contrast to the offerings of a simple website and ecommerce sites. Note that some consumer facing websites, e.g., Facebook™ and Yammer™ which offer social networks are the type of SaaS applications considered here. Some SaaS applications, e.g., Google's Gmail™ can be a hybrid with some free users using the application generally while other corporations use it as an enterprise subscription. Note that a SaaS application can be supported by both web browser clients and application clients that use URL-based APIs (application programming interfaces). Thus, using Dropbox™ as an example, user activity on the Dropbox™ website, as well as activity of the Dropbox™ client on the computer could be monitored.

Identity Provider (IDP): As used herein, the entity that actually authenticates the user is referred to as an "identity provider". IDP also provides the user identities and contains the user profiles, including additional information about the users such as first name, last name, job code, phone number, address, etc. Depending on the application, some IDPs may require a very simple profile (e.g., username, e-mail), while others may require a richer set of user data (e.g., job code, department, address, location, manager, etc.). The IDP also serves as an Identity-as-a-Service (IDaaS).

Identity-as-a-Service (IDaaS): As used herein, the cloud-based IDP that provides a set of identity and access management functions to target SPs is referred to as an "IDaaS". IDaaS functionality includes identity governance and administration (IGA), which includes the ability to provision identities held by the target SPs. IDaaS also provides user authentication, SSO, and authorization enforcement. Examples of common IDaaS providers today include Okta™, Ping Identity™, Windows Azure Active Directory™, EmpowerID™, OneLogin™, Bitium™ Centrify™, Identacor™, and LastPass™.

Trust Relationship: As used herein, a trust relationship between a SP and an IDP is established using digital certificates and/or cryptographic keys. The certificate or key, is issued by a trusted certification authority, and installed on both ends of a digital transaction. The certificate or key ensures that the information delivered by the IDP to the SP is authentic and uncompromised. When the IDP delivers an assertion to the SP, the certificate or key ensures that the information can be trusted. The trust relationship is established by configuring an IDP URL at the SP and configuring at the IDP a URL of the SP's assertion consumer service (ACS).

Modification of a Trust Relationship: As used herein, modification of a trust relationship between a SP and an IDP refers to requiring the SP to trust an intermediate entity placed in line between the SP and IDP, rather than directly trusting the IDP itself. The trust relationship is modified when the intermediate entity is a CASB or reverse proxy, where instead of configuring a digital certificate or key of the IDP at the SP, a digital certificate or key of the CASB or the reverse proxy is configured at the SP. The trust relationship is also modified when the public key used to verify the assertion at the SP is shared between the CASB or the reverse proxy and the SP, rather than being shared between the SP and the IDP. The trust relationship is also modified when the SP is configured to forward an authentication request to a CASB URL or a reverse proxy URL, rather than to an IDP URL. The trust relationship is also modified when contents of an assertion generated by the IDP are modified by an intermediary such as a CASB or a reverse proxy.

Netskope-CASB (N-CASB): As used herein, "Netskope-CASB" is a network security system that serves as a cloud-based security apparatus or on-premises policy enforcement point, placed between users and SaaS applications to combine and interject enterprise security policies as the SaaS applications are accessed. N-CASB consolidates multiple types of security policy enforcement. Example security policies include authentication, federated single sign-on (SSO), authorization, credential mapping, device profiling, encryption, tokenization, data leakage prevention (DLP), logging, alerting, malware detection/prevention, and so on. The N-CASB analyzes the application layer traffic using APIs for deeply inspecting SaaS application transactions in real-time. For additional information regarding the N-CASB, reference can be made to, for example, commonly owned U.S. patent application Ser. Nos. 14/198,499; 14/198, 508; 14/835,640; 14/835,632; and 62/307,305; Cheng, Ithal, Narayanaswamy, and Malmskog. Cloud Security For Dummies, Netskope Special Edition. John Wiley & Sons, Inc. 2015; "Netskope Introspection" by Netskope, Inc.; "Data Loss Prevention and Monitoring in the Cloud" by Netskope, Inc.; "Cloud Data Loss Prevention Reference Architecture" by Netskope, Inc.; "The 5 Steps to Cloud Confidence" by Netskope, Inc.; "The Netskope Active Platform" by Netskope, Inc.; "The Netskope Advantage: Three "Must-Have" Requirements for Cloud Access Security Brokers" by Netskope, Inc.; "The 15 Critical CASB Use Cases" by Netskope, Inc.; "Netskope Active Cloud DLP" by Netskope, Inc.; "Repave the Cloud-Data Breach Collision Course" by Netskope, Inc.; and "Netskope Cloud Confidence Index™" by Netskope, Inc., which are incorporated by reference for all purposes as if fully set forth herein.

Additionally, unlike existing CASBs, N-CASB behaves as an assertion proxy that preserves the trust relationship between an IDP or IDaaS and a SP or SaaS application. The N-CASB can also serve as an assertion consumer service (ACS) that is responsible for receiving assertions from the IDP. The N-CASB also encrypts the assertions received from the IDP (e.g., using a SP or SaaS public key) and forwards the encrypted assertions to the SP.

Unmanaged Device: As used herein, an "unmanaged device" is referred to as a Bring Your Own Device (BYOD) and/or an off-network device whose traffic is not being tunneled through a policy-enforcing server. The N-CASB analyzes the incoming traffic to determine whether the SaaS application transactions are made within the confines of a corporate network and/or from a device with a security agent or security profile installed. A device can be classified as an unmanaged device or as a managed device based on certain device characteristics collected by an endpoint routing agent (ERC). Depending on the type of device, ERC can be a virtual private network (VPN) such as VPN on demand or per-app-VPN that use certificate-based authentication. For example, for iOS™ devices, it can be a per-app-VPN or can be a set of domain-based VPN profiles. For Android™ devices, it can be a cloud director mobile app. For Windows™ devices, it can be a per-app-VPN or can be a set of domain-based VPN profiles. ERC can also be an agent that is downloaded using e-mail or silently installed using mass deployment tools like ConfigMgr™, Altris™, and Jamft™.

ERC collects device information such as registry key, active directory (AD) membership, presence of a process, operating system type, presence of a file, AD domain, encryption check, OPSWAT check, media access control (MAC) address, IMEI number, and device serial number. Based on the collected device information, ERC classifies the device as unmanaged or managed. Additional or different categories can be used to classify a device such as a semi-managed device category or an unknown device category.

For additional information regarding how the N-CASB determines whether the incoming traffic is routed from a managed device or an unmanaged device, reference can be made to, for example, commonly owned U.S. patent application Ser. Nos. 14/198,499; 14/198,508; 14/835,640; 14/835,632; and 62/307,305, which are incorporated by reference for all purposes as if fully set forth herein.

Policy: As used herein, the term "policy", sometimes also referred to as a policy definition or policy data or content policy refers to a machine-readable representation of flow control and content control requirements for SaaS applications. Typically, a policy is defined by one or more administrators at a corporation, or other entity, and is enforced upon users within that corporation, or entity. It is possible for individuals to define policies for their own usage that are enforced upon them; however, corporate usage is the more common case. It is also possible for a policy to be enforced on visitors or customers of a SaaS application, e.g., where a corporation hosts or subscribes to a SaaS application and requires visiting customers, users, or employees to adhere to the policy for use. Of particular note is that the policies considered herein are capable of being sensitive to the semantics of a SaaS application, which is to say a policy can differentiate between logging in to a SaaS application from, say, editing documents on the SaaS application.

Context is important for understanding usage; for an entity, the collection of dozens or hundreds of individual policies (e.g., log bulk downloads, prohibit editing documents on the service, only allow bulk downloads for users who are in the "Vice President" group) is referred to singularly as one policy, or one policy definition. Thus, a system supporting multiple entities will generally have one policy per entity, each made up of dozens or hundreds of individual flow control and content control policies. Similarly, the policy that is transferred to individual computers can be a subset of a full corporate policy, e.g., solely a machine-readable representation of the URLs of interest, as opposed to the full policy specification for each URL describing the flow control and/or content manipulations.

Multi-Part Policy: As used herein, a "multi-part policy" refers to a policy that specifies triggering of at least one security action when at least one condition about the transaction is met. A multi-part policy applies to a single transaction, but at least one policy condition of the multi-part policy requires evaluation of data or metadata not available in the single transaction. Also, a multi-part policy applies to a single transaction, but at least one policy condition of the multi-part policy requires evaluation of data or metadata available in an external data or metadata store. Further, a multi-part policy applies to a single transaction, but at least one policy condition of the multi-part policy requires evaluation of data or metadata generated by an external engine. A multi-part policy applies in real-time during active analysis, but at least one policy condition of the multi-part policy requires evaluation of data or metadata collected in deferred time or during non-real-time inspection. Examples of multi-part policies include "prevent user form uploading/downloading, if user is at risk as indicated by anomaly detection", "prevent sharing of a file, if file is sensitive", "prevent download of a file to a device, if the device is at risk as indicated by a malware detection engine", "prevent deletion of a virtual machine, if the virtual machine is a critical server", and others.

Application Programming Interface (API): As used herein, an "application programming interface" refers to a packaged collection of code libraries, routines, protocols methods and fields that belong to a set of classes, including its interface types. The API defines the way that developers and programmers can use the classes for their own software development, just by importing the relevant classes and writing statements that instantiate the classes and call their methods and fields. An API is a source code based specification intended to be used as an interface by software components to communicate with each other. An API can include specifications for routines, data structures, object classes and variables. Basically, an API provides an interface for developers and programmers to access the underlying platform capabilities and features of online social networks. The technology disclosed uses different types of APIs, including web service APIs such as HTTP or HTTPs based APIs like SOAP, Bulk, XML-RPC and JSON-RPC and REST APIs (e.g., Flickr™, Google Static Maps™, Google Geolocation™), web socket APIs, library-based APIs like JavaScript and TWAIN (e.g., Google Maps™ JavaScript API, Dropbox™ JavaScript Data store API, Twilio™ APIs, Oracle Call Interface (OCI)), class-based APIs (objet orientation) like Java API and Android API (e.g., Google Maps™ Android API, MSDN Class Library for .NET Framework, Twilio™ APIs for Java and C#), OS functions and routines like access to file system and access to user interface, object remoting APIs like CORBA and .NET Remoting and hardware APIs like video acceleration, hard disk drives, and PCI buses. Other examples of APIs used by the technology disclosed include Amazon EC2 API™, Box Content API™, Microsoft Graph™, Dropbox API™, Dropbox API v2™, Dropbox Core API™, Dropbox Core API v2™, Facebook Graph API™, Foursquare API™, Geonames API™, Force.com API™, Force.com Metadata API™, Apex API™, Visualforce API™, Force.com Enterprise WSDL™, Salesforce.com Streaming API™, Salesforce.com Tooling API™, Google Drive API™, Drive REST API™, AccuWeather API™, aggregated-single API like CloudRail™ API, and others.

Mobile and Tablet vs. Computer: Portions of the specification may make distinctions between two types of client devices used by users to access SaaS applications. The primary distinction is between the mechanisms for coupling the client device to the N-CASB. In relation to client devices, the term "computer" will refer to more open systems where the N-CASB can more directly install software and modify the networking stack. Similarly, in relation to client devices, the terms "mobile" or "tablet" will refer to more closed systems where the network security system options for modifying the network stack are more limited. This terminology mirrors the situation today where computer-client devices running Mac OS X, Windows desktop versions, Android, and/or Linux can be more easily modified than mobile or tablet devices running iOS, and/or Windows Mobile. Thus, the terminology refers to how third-party operating system vendor limitations are addressed to provide access to the network security system as opposed to a fundamental technical difference between the types of client devices. Further, if mobile OS vendors open their systems further, it is likely that the distinction could be eliminated with more classes of client devices. Additionally, it can be the case that certain server computers and other computing devices within an organization can have the client installed to cover machine-to-machine communications.

A closely related point is that some clients interface with the N-CASB differently. The browser add-on clients, for example, redirect the browsers to an explicit proxy. Only the traffic needed to apply the policy to is rerouted and it is done so within the application. The traffic arriving at the N-CASB can have the user identity embedded in the data or within the secure tunnel headers, e.g., additional headers or SSL client side certificates. Other clients redirect select network traffic through transparent proxies. For these connections, some traffic beyond exactly those requests needed by the policy can be routed to the N-CASB. Further, the user identity information is generally not within the data itself, but rather established by the client in setting up a secure tunnel to the N-CASB.

User Identity: As used herein, "user identity" or "user identification" refers to an indicator that is provided to the client device. It can be in the form of a token, a unique identifier such as a UUID, a public-key certificate, or the like. The user identity can be linked to a specific user and a specific device; thus, the same individual can have a different user identity on their mobile phone vs. their computer. The user identity can be linked to an entry or userID corporate identity directory, but is distinct from it. A cryptographic certificate can be used as the user identity. The user identity can be solely unique to the user and be identical across devices.

INTRODUCTION

With the objective to overcome the limitations of existing CASBs, an improved CASB has been developed by Netskope, Inc.™. This improved CASB is referred to herein as "Netskope-CASB (N-CASB)", features and implementations of which are described in the following.

Existing CASB servers behave as intrusive proxies that insert themselves in the middle of the trusted authentication conversation between the SP and the IDP. To resolve the incompatibility of existing CASBs to effectively operate in conjunction with federated SSO, the technology disclosed proposes a system and methods wherein an improved CASB (termed Netskope-CASB (N-CASB)) behaves as an assertion proxy, preserving the trust relationship between the SP and the IDP. In this way, the N-CASB can be used for its original purposes of managing access to the SaaS applications, while not hindering the security and user identity management (UID) that IDP provides for federated SSO authentication with the SaaS applications.

Trust Relationship

Figure 2:
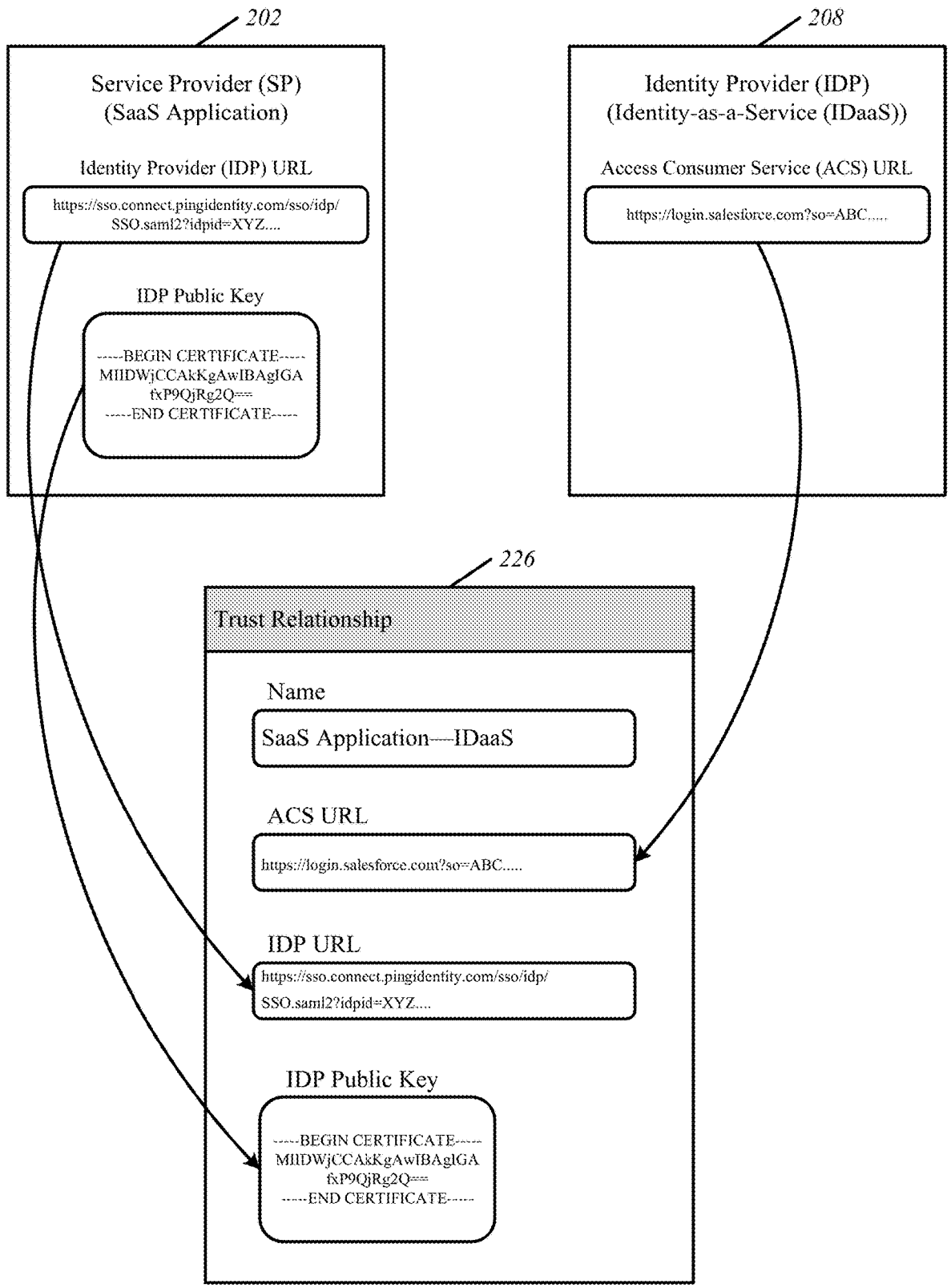
FIG. 2 shows one implementation of establishing a trust relationship between a service provider (SP) and an identity provider (IDP).
Figure 3:
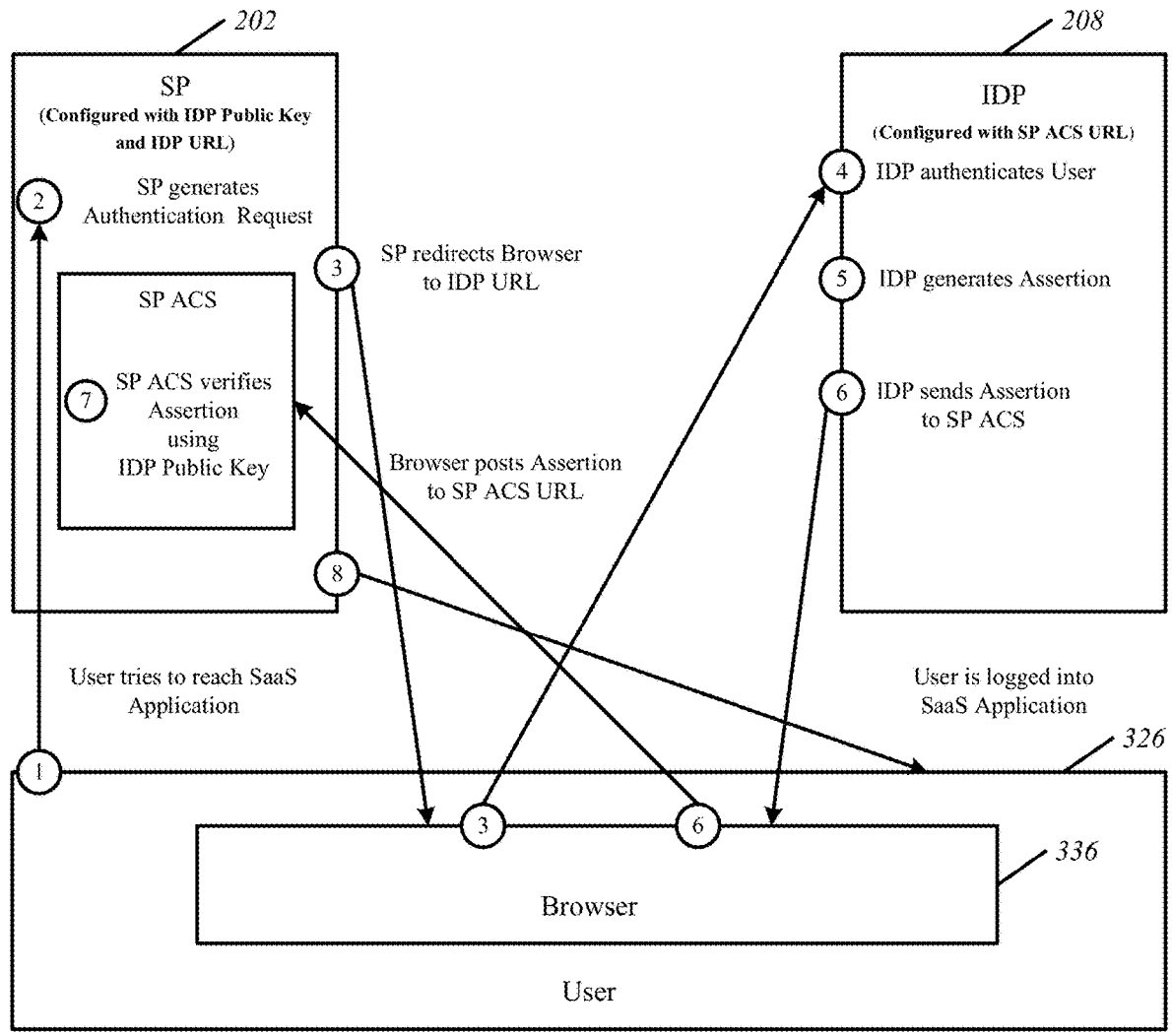
FIG. 3 shows one implementation of a message exchange chart of federated Single Sign-On (SSO) based on the trust established in FIG. 2.

FIG. 2 shows one implementation of establishing a trust relationship between a service provider (SP) and an identity provider (IDP). Complementary to FIG. 2, FIG. 3 shows one implementation of a message exchange chart of federated Single Sign-On (SSO) based on the trust established in FIG. 2.

Before the SSO authentication method can work, the organization, company, or enterprise, on behalf of the user, establishes a trust relationship with the IDP 208 in a separate off-line or out-of-band process shown in FIG. 2. This is done by configuring an IDP public key at the SP 202. Similarly the SP 202 has an independent trust relationship with the IDP 208. The SSO authentication method then provides the ability for the IDP 208 and multiple SaaS applications to dynamically establish secure one-on-one relationships. Briefly, the way the IDP 208 and the SP 202 trust each other is that they share keys for encryption and decryption, where the keys were established when the SSO implementation is first configured in FIG. 2.

FIG. 2 includes the SP 202, the IDP 208, and an organization's trust relationship establisher 226. The SP 202, the IDP 208, and the establisher 226 are connected via a network, such as the network 115. The SP 202 and the IDP 208 can be a workstation, server, computing cluster, blade server, server farm, or any other data processing system or computing device. In some implementations, the SP 202 is a SaaS application and the IDP 208 is an IDaaS provider. In one implementation, the SP 202 includes an assertion consumer service (ACS), which is accessible by an ACS URL. In another implementation, the IDP 208 is accessible by an IDP URL.

In FIG. 2, the establisher 226 is used to establish a trust relationship between the SP 202 and the IDP 208. In implementations, an organization, company, or enterprise has a portfolio of SaaS application subscriptions. In one implementation, the organization uses an IDaaS provider as the IDP 208 to perform user identity management (UID) across the entire portfolio of SaaS application subscriptions. In FIG. 2, the SP 202 represents just one SaaS application for clarity's sake. In other implementations, the establisher 226 can establish a trust relationship between a plurality of SaaS applications and the IDP 208.

In some implementations, the trust relationship between the SP 202 and the IDP 208 is established by configuring the IDP URL at the SP 202 and configuring the SP ACS URL at the IDP 208. In other implementations, the trust relationship is established by configuring a public key or digital certificate of the IDP 208 at the SP 202. In FIG. 2, the establisher 226 can be used to configure the IDP URL and the IDP public key at the SP 202 and the SP ACS URL at the IDP 208, as shown.

FIG. 3 shows one implementation of a message exchange chart of federated SSO based on the trust established in FIG. 2. In the example illustrated in FIG. 3, the SSO is implemented using SAML. The SAML federated authentication can be "identity provider-initiated" or "service provider-initiated". In yet other implementations, different SSO technologies can be used, such as WS-Federation, OAuth, OpenID, SecureID, LDAP, Kerberos, SecureID, Shibboleth System, eXtensible Access Control Markup Language (XACML), and Service Provisioning Markup Language (SPML).

Regarding SAML, SAML provides a secure, XML-based solution for exchanging user security information between a service provider (e.g., the SP 202) that may be a SaaS application and an identity provider (e.g., the IDP 208) that may be an IDaaS provider. A description of SAML 2.0 can be found on the web at <https://en.wikipedia.org/wiki/SAML_2.0>; <http://saml.xml.org/saml-specifications>; and <http://docs.oasis-open.org/security/saml/Post2.0/sstc-saml-tech-overview-2.0.html>. Another description of SSO with SAML can be found at <https://developer.salesforce.com/page/Single Sign-On with SAML on Force.com>.

In FIG. 3, the IDP 208 is the asserting party, the SP 202 is the party relying on the assertion, and the user 326 operating a client with browser 336 is the subject of the assertion. The IDP 208 is the authority system that provides information confirming the user's identity. The SP 202 is the system that trusts the identity provider's user information, and uses this information to provide access to the SaaS application. The transaction from the IDP 208 to the SP 202 is called a SAML assertion. The structure of the SAML assertion is defined by an XML schema that is specified by the Organization for the Advancement of Structured Information Standards (OASIS) SAML standard. The SAML assertion contains header information, and statements about the subject in the form of attributes and conditions such as a start and logout URL. Web browser SSO is SAML's most widely used feature and is typically used in conjunction with the Hypertext Transfer Protocol (HTTP) POST binding and authentication request protocol. Web browser SSO can be initiated by the IDP 208 or by the SP 202 if a user's session has not been established. The assertion is also digitally signed by the IDP 208.

In FIG. 3, all communications between the SP 202 and the IDP 208 occur via the browser 336. At exchange 1, the user 326 tries to log in to the SaaS application represented by the SP 202 or to any other resource or service hosted or provided by the SP 202. However, before the user 326 is able to use services provided by the SP 202, the "identity" of the user 326 must be provided by the IDP 208, and authenticated and accepted by the SP 202. This is what is meant by "authentication". The "identity" is an "assertion" that the IDP 208 provides to the user 326 once the IDP 208 has validated the identity of the user 326. This forms a trust relationship between the IDP 208 and the SaaS application hosted by the SP 202, as the user 326 takes the assertion provided by the IDP 208 and uses it as authentication to access the SaaS application, instead of having to log in again with a different set of credentials to the SP 202 for authentication. In one implementation, SAML 2.0 protocol provides the process and standard by which the authentication trust relationship is established and realized to allow the user 326 to authenticate once, against the IDP 208, and then use the assertion to access SaaS applications without having to re-authenticate during a session, as other SaaS applications accept the provided assertion as proof that an authentication check has already successfully been performed by the IDP 208.

In response, at exchange 2, the SP 202 generates an authentication request, i.e. a "SAML request", to request an authentication from the IDP 208. At exchange 3, the SP 202 redirects the browser 336 to the IDP URL. In other implementations, the redirection occurs via API calls from an application program of the user 326. At exchange 4, the IDP 208 authenticates the user 326, for example, by a multi-factor authentication mechanism or a previous IDP authentication session where the IDP 208 is part of a larger trust relationship and where the user 326 already has an assertion provided to it from another IDP.

Upon successful authentication of the user 326, the IDP 208 generates an "assertion" or "SAML assertion" at exchange 5 in the form of an XML payload back to the browser 336, which the user 326 can use to access the SaaS applications, for example the one hosted by the SP 202. The user 326 can present the assertion to the service provider (e.g., the SP 202) in place of performing another type of authentication (e.g., username/password login). Accordingly, at exchange 6, the IDP 208 sends the assertion to an ACS of the SP 202 via the browser 336, which posts the assertion to the ACS URL.

The assertion itself contains two components—the actual assertion, in the form of an XML document, and an assertion signature, which is essentially an encrypted version of the XML document. Since the signature is encrypted, the SP 202 must have been provided with a key during the initial configuration of the trust relationship, as depicted in FIG. 2. At exchange 7, the ACS of the SP 202 verifies the assertion using the IDP public key configured at the SP 202 during the separate off-line or out-of-band establishment of the trust relationship. In one implementation, the SP 202 opens the assertion document and sees a clear-text XML component, as well as a digital XML signature which is not encrypted because it is a one-way hash type signature. A document providing details on XML signature syntax and processing can be found at <https://www.w3.org/TR/xmldsig-core/>. The digital XML, signature is verified by hashing the clear-text XML content and comparing the resulting signature with the digital XML signature. The browser 336 does not actually have the key used for the XML signature generation. The browser 336 transmits the SAML authentication request and SAML response with the assertion but does not use any key for signing or authenticating. The browser 336 is just a conduit and just forwards the signed assertion response from the IDP 208 to the SP 202.

After a successful progress through the exchanges 1 to 7, the requested resource in the SP 202 is returned in the exchange 8 to the user 326, who is now logged in with the SP 202. Exchanges 1 to 7 constitute a complete IDP authentication session for the user 326. Once the user has been authenticated against the IDP 208, and gets provided with the assertion, the user 326 can then use this assertion repeatedly. In some implementations, the user 326 can use it with different service providers and SaaS applications, provided those SPs and SaaS applications have already been configured to accept assertions from the same IDP 208, by virtue of sharing of an encryption public key.

Trust Relationship Modification

With establishment of a trust relationship understood in the context of federated SSO, the discussion now turns to how existing CASBs modify this trust relationship.

As discussed supra, existing CASBs modify the trust relationship between a SP and an IDP by configuring a CASB or reverse proxy encryption key at the SP, rather than configuring an IDP encryption key, as described in FIGS. 2 and 3. As a result, the assertion is verified at the SP using a digital certificate or key that is shared between the SP and the CASB or the reverse proxy, rather than being shared between the SP and the IDP.

Existing CASBs' modification of the trust relationship between the service provider and the identity provider is undesirable to most organizations for a variety of reasons. For instance, trust modification creates an increased risk of security breach because existing CASBs have access to, and often modify, the contents of the assertion. Since the assertion includes sensitive data, such as user credentials, organizations do not prefer that such sensitive data be exposed to the CASBs. The technology disclosed closes this security gap in federated SSO by encrypting the assertion at the IDP and preventing the N-CASB from accessing the contents of the assertion, let alone modifying them.

Also, often, the organizations have a service level agreement (SLA) with the identity providers, such as the IDaaS providers, which facilitate the federated SSO. Invariably, the SLA's technical requirement is that the organizations establish and maintain a direct trust relationship between the IDaaS provider and its SaaS application subscriptions. By inserting themselves between an organization's SaaS application subscriptions and the IDaaS provider and modifying the trust relationship, existing CASBs force the parties to violate the terms of their SLA. The technology disclosed overcomes this technical problem by preserving the trust relationship between the IDP and the SP, and thus enforcing compliance of SLAs, as described in detail below in FIGS. 7-14.

Figure 4:
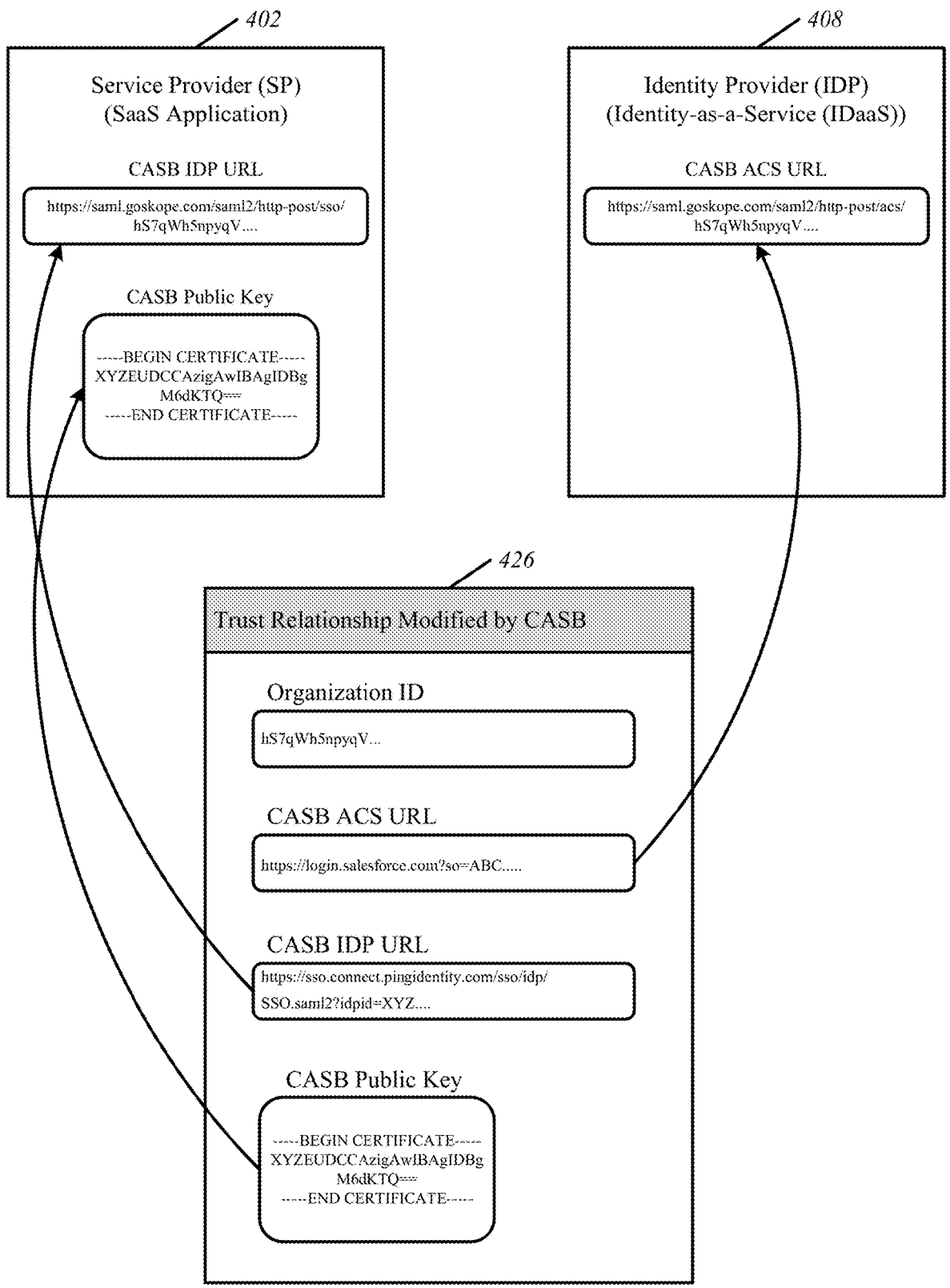
FIG. 4 shows one implementation of modifying a trust relationship between a service provider (SP) and an identity provider (IDP).

In FIG. 4, before this SSO authentication method can work, the organization, company, or enterprise, on behalf of the user, modifies a trust relationship between the SP 402 and the IDP 408 in a separate off-line or out-of-band process by configuring a CASB public key at the SP 402, instead of configuring an IDP public key. In some implementations, the trust relationship is also modified because a CASB IDP URL is configured at the SP 402, rather than a URL of the IDP 408, which causes the SP 402 to forward the authentication request to the CASB IDP and not to the IDP 408. In the example shown in FIG. 4, the trust relationship is modified using the modifier 426. Accordingly, the SP 402 no longer has an independent trust relationship with the IDP 408.

Figure 5:
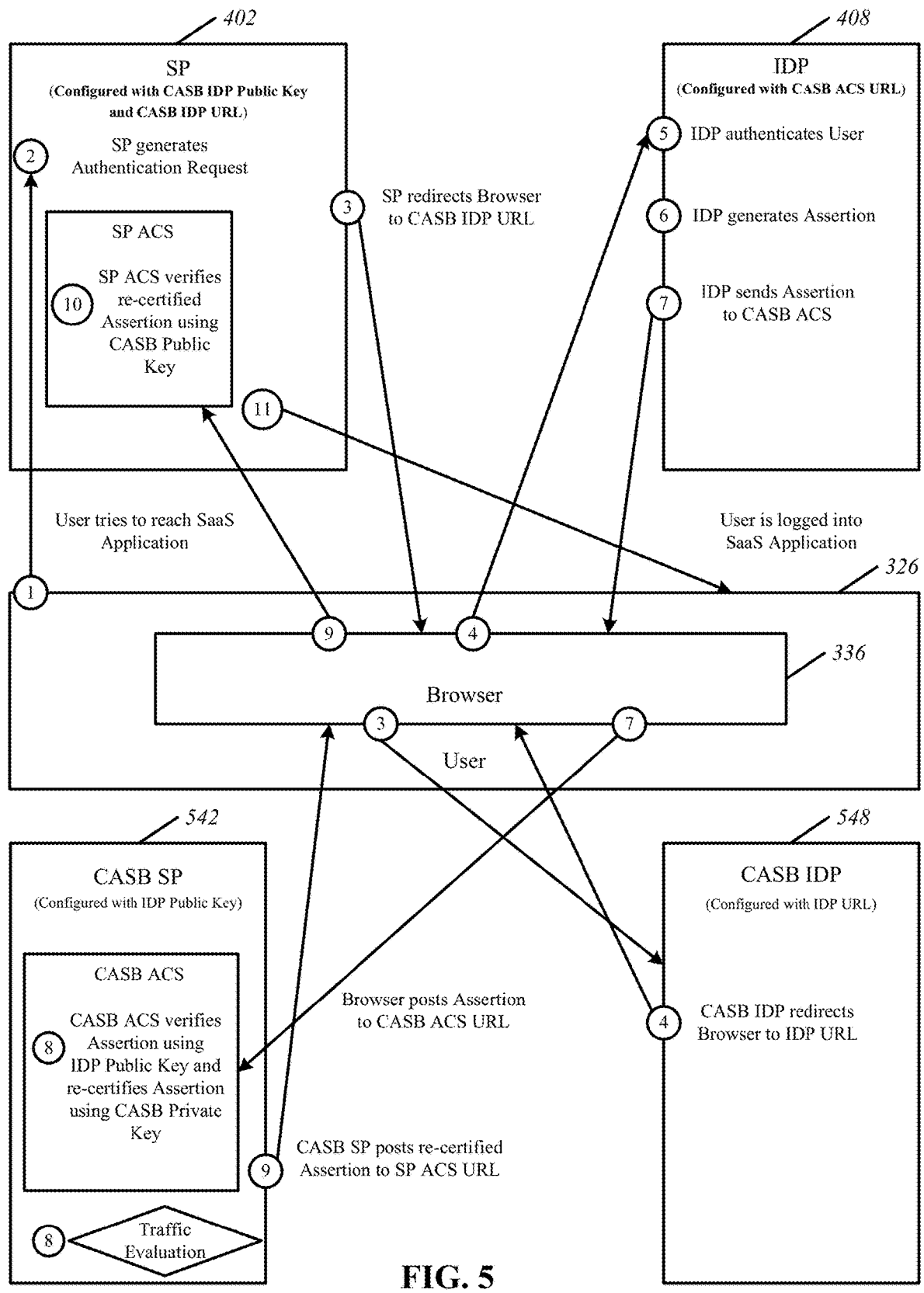
FIG. 5 shows one implementation of a message exchange chart of federated Single Sign-On (SSO) based on the trust modified in FIG. 4.

Complementary to FIG. 4, FIG. 5 shows one implementation of a message exchange chart of federated Single Sign-On (SSO) based on the trust modified in FIG. 4 by an inline CASB inserted in the middle of the trusted authentication conversation between the SP 402 and the IDP 408. In the example shown in FIG. 5, the SP 402 is configured with a CASB public key and a CASB IDP URL and the IDP 408 is configured with a CASB ACS URL. Accordingly, the SP 402 trusts a CASB IDP 548 instead of the IDP 408. Also, the IDP 408 trusts a CASB SP 542 instead of the SP 402.

In FIG. 5, all communications between the SP 402 and the IDP 408 occur via the browser 336. At exchange 1, the user 326 tries to log in to the SaaS application represented by the SP 402 or to any other resource or service hosted or provided by the SP 402. However, before the user 326 is able to use services provided by the SP 402, the "identity" of the user 326 must be provided by the IDP 408, and authenticated and accepted by the SP 402. This is what is meant by "authentication". In response, at exchange 2, the SP 402 generates an authentication request, i.e. a "SAML request", which is forwarded to the CASB IDP URL rather than to the IDP URL. At exchange 3, the SP 402 redirects the browser 336 to the CASB IDP URL. At exchange 4, the CASB IDP 548 redirects the browser 336 to the IDP URL. In other implementations, the redirection occurs via API calls from an application program of the user 326.

At exchange 5, the IDP 408 authenticates the user 326, for example, by a multi-factor authentication mechanism or a previous IDP authentication session where the IDP 408 is part of a larger trust relationship and where the user 326 already has an assertion provided to it from another IDP. Upon successful authentication of the user 326, the IDP 408 generates an "assertion" or "SAML assertion" at exchange 6 in the form of an XML payload back to the browser 336, which the user 326 can use to access the SaaS applications, for example the one hosted by the SP 402. The user 326 can present the assertion to the service provider (e.g., the SP 402) in place of performing another type of authentication (e.g., username/password login). Accordingly, at exchange 7, the IDP 408 sends the assertion to an ACS of the CASB SP 542 via the browser 336, rather than to an ACS of the SP 402.

At exchange 8, the CASB SP 542, which is configured with an IDP public key, verifies the assertion using the IDP public key and re-certifies the assertion using a CASB private key. Also at exchange 8, CASB evaluates the traffic to determine whether the traffic is routed from a managed device or an unmanaged device. If the traffic is routed from a managed device, then at exchange 9, the CASB SP 542 posts the re-certified assertion to the SP ACS URL via the browser 336. Then, at exchange 10, the SP ACS verifies the re-certified assertion using the CASB public key. Once the assertion is verified by the SP 402, the user is logged in to the SaaS application at exchange 11.

In contrast, if at exchange 8, the CASB determines that the traffic is routed from an unmanaged device, then, at exchange 12, the CASB SP 542 posts the re-certified assertion to a reverse proxy 602 via the browser 336, instead of posting it to the SP ACS URL. In one implementation, this is done by adding a revers proxy domain to the SP ACS URL or to a SaaS application URL (provided by the SP 402) to which the re-certified assertion was supposed to be posted. For example, if the SaaS application URL is "login.saasapplication.com", then the re-certified assertion is posted to "login.saasapplication.com/reverseproxydomian".

Figure 6:
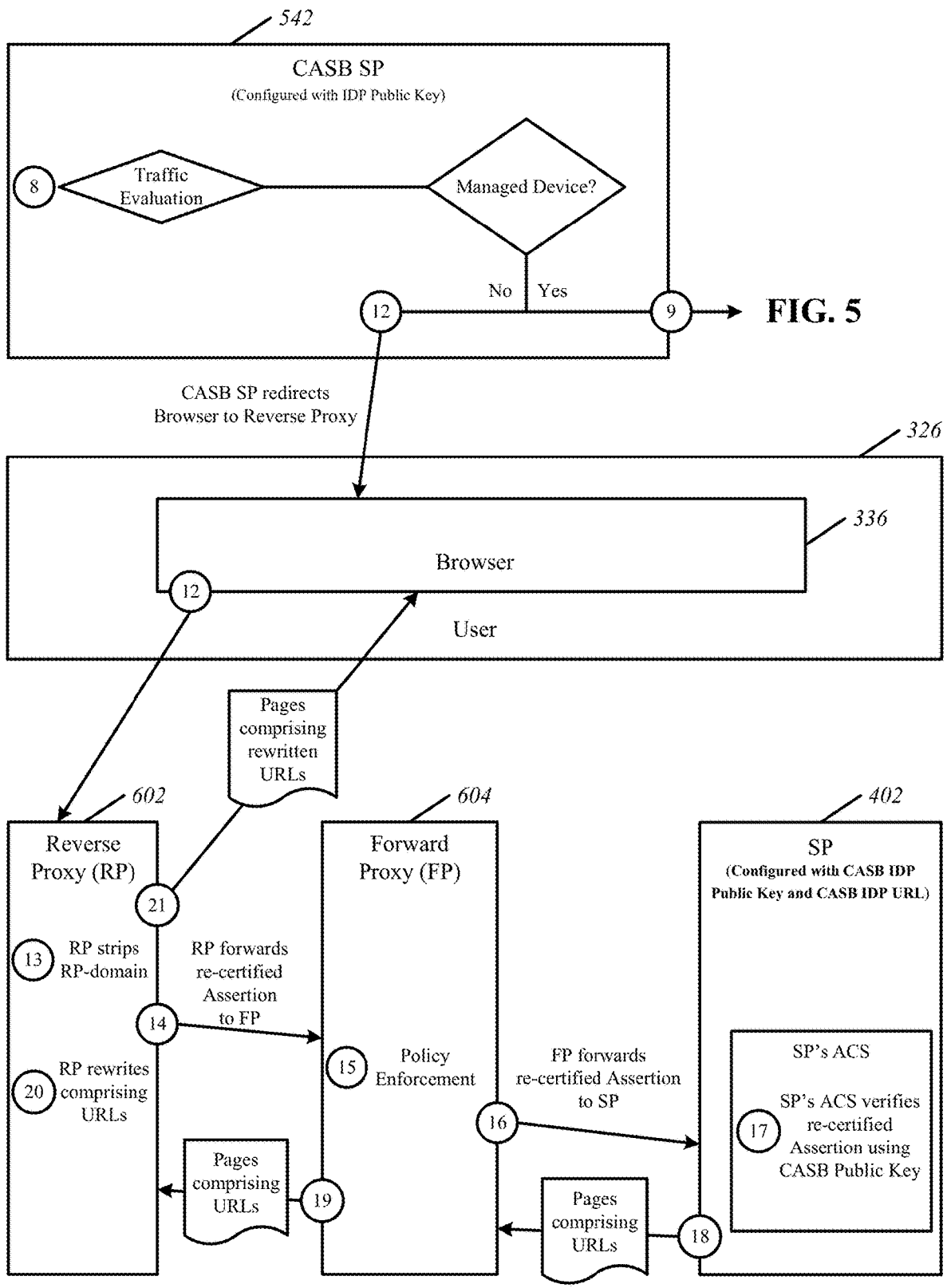
FIG. 6 shows one implementation of a reverse proxy routing traffic from an unmanaged device to a network security system for policy enforcement.

FIG. 6 shows one implementation of a reverse proxy routing traffic from an unmanaged device to a network security system for policy enforcement. The network security system can also serve as a forward proxy or a proxy server. A list of common uses of reverse proxies can be found in <https://en.wikipedia.org/wiki/Reverse_proxy>.

At exchange 13, the reverse proxy (RP) 602, after validating a validation token accompanied with the decrypted assertion, strips off the reverse proxy domain from the SP ACS URL of the re-certified assertion and forward the re-certified assertion to a network security system or forward proxy (FP) 604 at exchange 14. The validation token can be a cookie, an embedded parameter in a modified URL, and/or a header identified in the request. The FP 604, at exchange 15, enforces security policies on the routed traffic to control access to the SP 402. If the routed traffic is determined by the network security system or forward proxy 604 to not qualify for blocking or another security action based on the security policies, then the re-certified assertion is sent to the SP 402 at exchange 16.

At exchange 17, the ACS of the SP 402 verifies the assertion using the CASB public key, as it would have at exchange 10 in the case of a managed device. Further, the pages returned by the SP 402 at exchange 18 include a plurality of URLs, which are forwarded to the reverse proxy 602 by the network security system or forward proxy 604 at exchange 19. The reverse proxy 602 rewrites these URLs so that when the user 326 clicks on them, then instead of going directly to the SP 402, the user is tunneled through the network security system or forward proxy 604 for policy enforcement. This way, any subsequent traffic from the unmanaged device is mandatorily routed through the network security system or forward proxy 604.

System Overview

With modification of a trust relationship understood in the context of federated SSO, the discussion now turns to how the disclosed N-CASB preserves the trust relationship or the trust chain or the trusted conversation between a service provider and an identity provider.

We describe a system and various implementations to preserve the trust relationship established for federated SSO between a service provider (SP) and an identity provider (IDP) while enforcing network security policies on transactions involving the SP. The system is described with reference to FIG. 1, showing an architectural level schematic of a system in accordance with an implementation. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements in the system is described in greater detail. Finally, the processes are described in FIGS. 7-13.

FIG. 1 includes the SP 102 (hosting one or more SaaS applications) and the IDP 108 (representing an IDaaS). The system also includes the Netskope-CASB (N-CASB) 160, an assertion proxy 170, a reverse proxy 180, and a network security system 190. In some implementations, the proxies 170, 180, and 190 are hosted together as a combined unit part of the N-CASB 160. In other implementations, they are hosted separately. In one implementation, the assertion proxy 170 and the reverse proxy 180 are combined into a single proxy that performs the functionalities of both the assertion proxy 170 and the reverse proxy 180. In some implementations, the proxies 170, 180, and 190 are cloud-based proxies. In other implementations, the proxies 170, 180, and 190 are on-premise proxies. The network security system 190 stores, among other things, content policies 191, content profiles 192, content inspection rules 193, enterprise data 194, and user identities 196. In some implementations, the network security system 190 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. The client devices 150 include the mobile 152 and the computer 154.

In implementations, the system shown in FIG. 1 includes an improved CASB, referred to herein as the "Netskope- CASB (N-CASB))", which preserves the trust relationship between the SP 102 and the IDP 108 while controlling access to the SaaS application using a variety of mechanisms and components such as log-based discovery, deep API inspection (DAPII), introspection, inline agentless steering, inline thin agent or mobile profile steering, reverse proxy 180, network security system 190, monitor 120, active analyzer 130, inspective analyzer 140, extraction engine 121, classification engine 122, security engine 123, management plane 124, and data plane 125, and so on. For additional information regarding the functionality of the N-CASB 160, reference can be made to, for example, commonly owned U.S. patent application Ser. Nos. 14/198, 499; 14/198,508; 14/835,640; 14/835,632; and 62/307,305; Cheng, Ithal, Narayanaswamy, and Malmskog. Cloud Security For Dummies, Netskope Special Edition. John Wiley & Sons, Inc. 2015; "Netskope Introspection" by Netskope, Inc.; "Data Loss Prevention and Monitoring in the Cloud" by Netskope, Inc.; "Cloud Data Loss Prevention Reference Architecture" by Netskope, Inc.; "The 5 Steps to Cloud Confidence" by Netskope, Inc.; "The Netskope Active Platform" by Netskope, Inc.; "The Netskope Advantage: Three "Must-Have" Requirements for Cloud Access Security Brokers" by Netskope, Inc.; "The 15 Critical CASB Use Cases" by Netskope, Inc.; "Netskope Active Cloud DLP" by Netskope, Inc.; "Repave the Cloud-Data Breach Collision Course" by Netskope, Inc.; and "Netskope Cloud Confidence Index™" by Netskope, Inc., which are incorporated by reference for all purposes as if fully set forth herein.

The interconnection of the elements of the system shown in FIG. 1 are now described. The network 115 couples the mobile 152, the computer 154, the SP 102, the IDP 108, and the N-CASB 160 in communication (indicated by solid lines). The actual communication path can be point-to-point over public and/or private networks. All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Monitor 120 and the network security system 190 can include one or more computers and computer systems coupled in communication with one another. They can also be one or more virtual computing and/or storage resources. For example, the monitor 120 can be one or more Amazon EC2 instances and the network security system 190 can be an Amazon S3 storage. Other computing-as-service platforms such as Force.com™ from Salesforce™, Rackspace™, or Heroku™ could be used rather than implementing the N-CASB 160 on direct physical computers or traditional virtual machines. Additionally, to implement the functionalities of the N-CASB 160, one or more engines can be used and one or more points of presence (POPs) can be established. The engines can be of varying types including a workstation, server, computing cluster, blade server, server farm, or any other data processing system or computing device. The engines can be communicably coupled to the databases via a different network connection. For example, the extraction engine 121 can be coupled via the network(s) 115 (e.g., the Internet), classification engine 122 can be coupled via a direct network link and security engine 123 can be coupled by yet a different network connection. In other examples, the data plane 125 POPs can be distributed geographically and/or co-hosted with particular cloud services. Similarly, the management plane 124 POPs can be distributed geographically. The two types of POPs can be either separately hosted or co-hosted as well.

Having described the elements of FIG. 1 and their interconnections, elements of the figure will now be described in greater detail. The N-CASB 160 provides a variety of functionalities via the management plane 124 and the data plane 125. Data plane 125 includes an extraction engine 121, a classification engine 122, and a security engine 123, according to one implementation. Other functionalities, e.g., a control plane, can also be provided. These functionalities collectively provide secure interfacing with the SP 102 by the client devices 150. Although we use the term network security system to describe the N-CASB 160, more generally the system provides application visibility and control functions as well as security.

The network security system 190, according to one implementation, includes a plurality of computing devices with a web browser with a secure, web-delivered interface provided by the N-CASB 160 to define and administer the content policies 191. The N-CASB 160 according to some implementations is a multi-tenant system, so a user of a management client can only change the content policies 191 associated with her organization. In some implementations, APIs can be provided for programmatically defining and or updating policies. In such implementations, the network security system 190 can include one or more servers, e.g. a corporate identities directory such as a Microsoft Active Directory, pushing updates, and/or responding to pull requests for updates to the content policies 191. Both systems can co-exist; for example, some companies may use a corporate identities directory to automate identification of users within the organization while using a web interface for tailoring policies to their needs. Management clients are assigned roles and access to the network security system 190 data is controlled based on roles, e.g., read-only vs. read-write.

A general view of how the N-CASB 160 functions has been provided. Companies, or more generally any individual or entity, wishing to better secure their use of SaaS applications sign up with the N-CASB 160. Using a web-based interface and a computer device, the company can establish a policy in the content policies 191 for their users. For each activity that involves manipulation of content, one or more content inspection rules are applied to the content by the N-CASB 160. If it is determined that the content is subject to content control, i.e. it is sensitive data, then one or more security actions are triggered to prevent leakage or breach of sensitive data enclosed in the content. These approaches will both be discussed now in greater detail.

Figure 7:
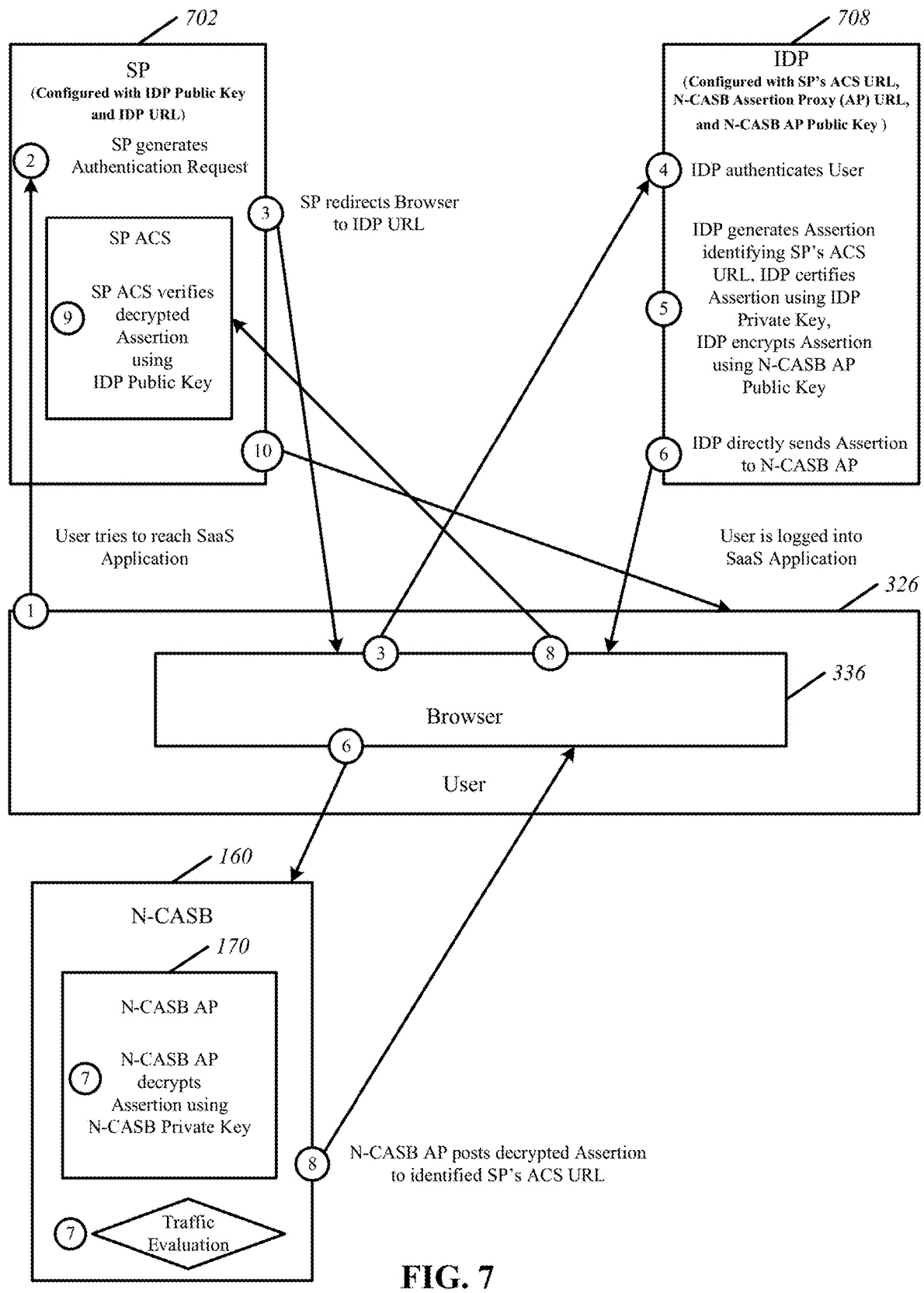
FIG. 7 shows one implementation of the trust relationship preservation during a federated SSO session by a N-CASB assertion proxy (AP).

While the system shown in FIG. 1 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components (e.g., for data communication) can be wired and/or wireless as desired. The different elements or components can be combined into single software modules and multiple software modules can run on the same hardware.

Trust Relationship Preservation FIG. 7 shows one implementation of the trust relationship preservation during a federated SSO session by the N-CASB assertion proxy (AP) 170. In particular, FIG. 7 shows one implementation of a message exchange chart of federated SSO based on SAML. While a detailed description of just the "service provider-initiated" login method as a SAML federated authentication method with the N-CASB AP 170 is disclosed in one implementation of the technology disclosed, it is understood that other types of SAML authentication methods, including "identity provider-initiated" login are readily derived from the present disclosure, and are within the scope of the technology disclosed. Alternate message exchanges and sequences are also possible. For example in "identity provider-initiated" login, the initial login is directed to the identity provider (whose public key is configured at the service provider), which forwards the assertion to the N-CASB AP 170. In other implementations, different federated SSO technologies can be used, such as WS-Federation, OAuth, OpenID, SecureID, LDAP, Kerberos, SecureID, Shibboleth System, eXtensible Access Control Markup Language (XACML), and Service Provisioning Markup Language (SPML).

FIG. 7 includes a service provider (SP) 702 and an identity provider (ID) 708. Similar to the configuration shown in FIG. 3, in a separate off-line or out-of-band process, the SP 702 is configured with a public key of the IDP 708 and a URL of the IDP 708. Also in a separate off-line or out-of-band process, the IDP 708 is configured with an ACS URL of the SP 702, a URL of the N-CASB AP 170, and a public key of the N-CASB AP 170.

In one implementation, the technology disclosed preserves the trust relationship between the SP 702 and the IDP 708 during federated SSO by inserting the N-CASB AP 170 in the assertion forwarding chain between the SP 702 and the IDP 708, rather than in the trust chain between the SP 702 and the IDP 708.

In another implementation, the technology disclosed preserves the trust relationship between the SP 702 and the IDP 708 during federated SSO by configuring a digital certificate or key of the IDP 708 at the SP 702, instead of configuring a digital certificate or key of the N-CASB 160 or the N-CASB AP 170, and verifying, at the SP 702, an assertion generated by the IDP 708 using a public key of the IDP 708, rather than using a public key of the N-CASB 160 or of the N-CASB AP 170.

In yet another implementation, the technology disclosed preserves the trust relationship between the SP 702 and the IDP 708 during federated SSO by configuring the SP 702 to forward an authentication request to a URL of the IDP 708, rather than to a URL of the N-CASB 160 or of the N-CASB AP 170.

In a further implementation, the technology disclosed preserves the trust relationship between the SP 702 and the IDP 708 during federated SSO by preventing the N-CASB 160 or the N-CASB AP 170 from accessing and modifying the contents of the assertion generated by the IDP 708.

In FIG. 7, all communications between the SP 702 and the IDP 708 occur via the browser 336. At exchange 1, the user 326 tries to log in to the SaaS application represented by the SP 702 or to any other resource or service hosted or provided by the SP 702. However, before the user 326 is able to use services provided by the SP 702, the "identity" of the user 326 must be provided by the IDP 708, and authenticated and accepted by the SP 702. This is what is meant by "authentication". In response, at exchange 2, the SP 702 generates an authentication request, i.e. a "SAML request", which is forwarded to a URL of the IDP 708. At exchange 3, the SP 702 redirects the browser 336 to the URL of the IDP 708. In other implementations, the redirection occurs via API calls from an application program of the user 326.

At exchange 4, the IDP 708 authenticates the user 326, for example, by a multi-factor authentication mechanism or a previous IDP authentication session where the IDP 708 is part of a larger trust relationship and where the user 326 already has an assertion provided to it from another IDP. Upon successful authentication of the user 326, the IDP 708 generates an "assertion" or "SAML assertion" at exchange 5.

Within the assertion itself, the IDP 708 identifies a destination/recipient URL. The IDP 708 is configured to identify the destination/recipient URL as the ACS URL of the SP 702. Such an IDP and assertion configuration is different from the IDP and assertion configuration implemented by existing CASBs, which change or modify the destination/recipient URL within the assertion to be the CASB URL or the reverse proxy URL, rather than be the SP ACS URL. According to some implementations, the technology disclosed achieves this by preventing the N-CASB 160 and/or the N-CASB AP 170 from accessing and modifying the contents (e.g., the destination/recipient URL of the assertion) of the assertion generated by the IDP 708.

Once generated, the IDP 708 certifies the assertion using an IDP private key and encrypts the certified assertion using a public key of the N-CASB AP 170. Encryption ensures that the user 326 is not able to bypass the N-CASB AP 170 or the N-CASB 160 because, without the N-CASB AP 170 or the N-CASB 160 decrypting the encrypted assertion, the user 326 cannot use the encrypted assertion to access the SP 702.

At exchange 6, the IDP 708 forwards the encrypted and certified assertion to the N-CASB AP 170. Note that the posting of the encrypted and certified assertion to the N-CASB AP 170 is achieved without accessing or modifying the contents of the assertion generated by the IDP 708. In particular, the posting occurs without changing or modifying a destination/recipient URL of the assertion. In one implementation, this is achieved by the off-line or out-of-band configuration of the IDP 708 with a URL of the N-CASB AP 170, as discussed supra. This configuration ensures that the encrypted and certified assertion is posted to the N-CASB AP 170; thus, obviating the need to change or modify the destination/recipient URL within the assertion.

At exchange 7, the N-CASB AP 170 decrypts the encrypted assertion using a private key of the N-CASB AP 170. Also at exchange 7, the N-CASB 160 or the N-CASB AP 170 evaluates the traffic to determine whether the traffic is routed from a managed device or an unmanaged device. If the traffic is routed from a managed device, then at exchange 8, the N-CASB AP 170 posts the decrypted assertion to the ACS URL of the SP 702 identified within the assertion. Then, at exchange 10, the ACS of the SP 702 verifies the decrypted assertion using the IDP public key. This is in contrast with existing CASBs, which, for the federated SSO authentication, use a CASB public key instead of the IDP public key and, as a result, modify the trust relationship between the SP and IDP.

Once the assertion is verified by the SP 702, the user is logged in to the SaaS application at exchange 10.

In contrast, if at exchange 7, the N-CASB 160 or the N-CASB AP 170 determines that the traffic is routed from an unmanaged device, then, at exchange 10, the N-CASB 160 or the N-CASB AP 170 posts the decrypted assertion to a reverse proxy 180 via the browser 336, instead of posting it to the ACS of the SP 702. In one implementation, this is done by adding a revers proxy domain to the ACS URL of the SP 702 or to a SaaS application URL (provided by the SP 702) to which the decrypted assertion was supposed to be posted. For example, if the SaaS application URL is "log-in.saasapplication.com", then the decrypted assertion is posted to "login.saasapplication.com/reverseproxydomian".

Figure 8:
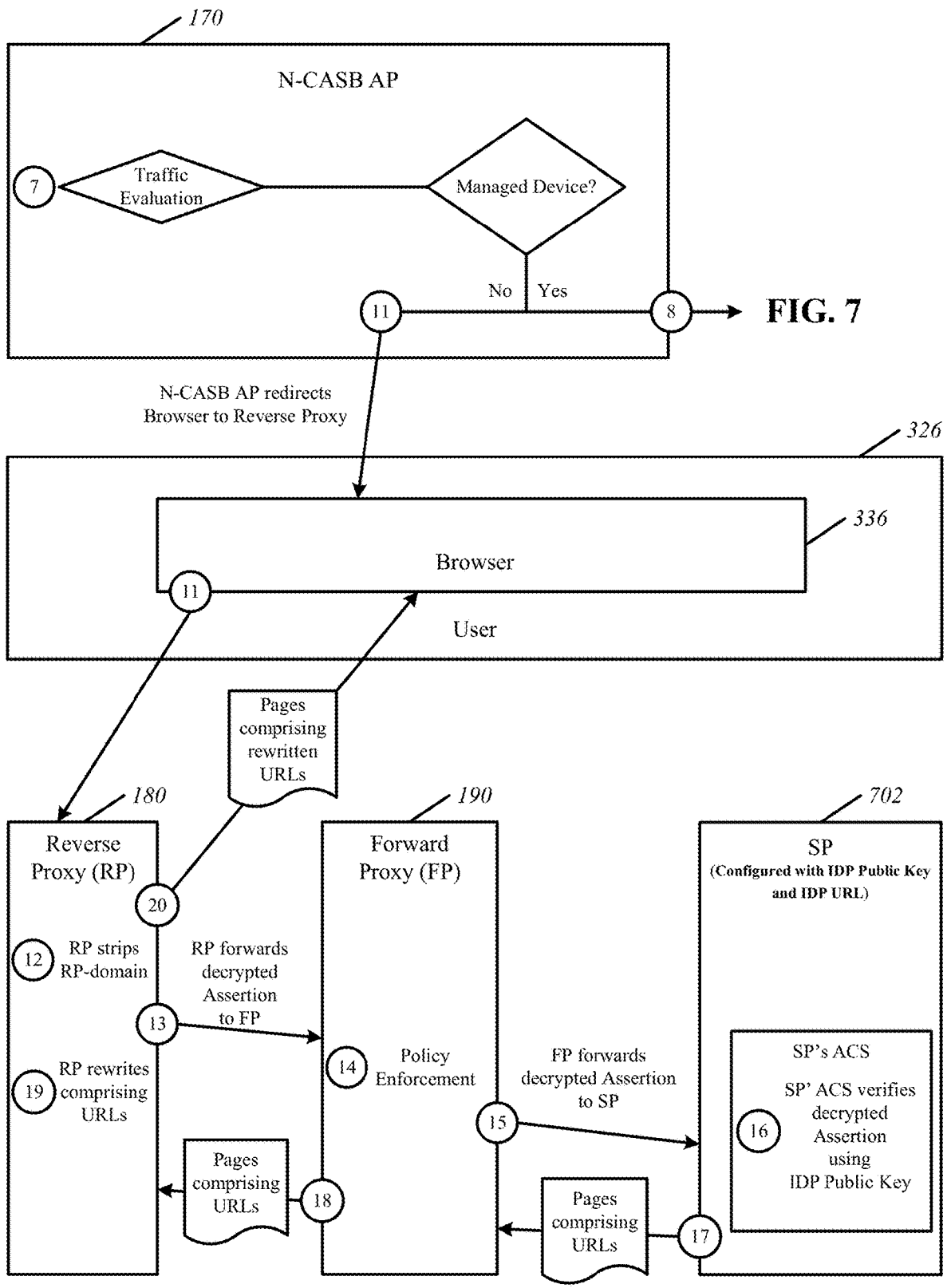
FIG. 8 shows another implementation of a reverse proxy routing traffic from an unmanaged device to a network security system for policy enforcement.

FIG. 8 shows another implementation of a reverse proxy routing traffic from an unmanaged device to a network security system for policy enforcement. A list of common uses of reverse proxies may be found in <https://en.wikipedia.org/wiki/Reverse_proxy>.

At exchange 12, the reverse proxy (RP) 180 strips off the reverse proxy domain from ACS URL of the SP 702 of the decrypted assertion and forwards the decrypted assertion to a network security system or forward proxy (FP) 190 at exchange 13. The FP 190, at exchange 14, enforces security policies on the routed traffic to control access to the SP 702, as described supra in the discussion of FIG. 1. If the routed traffic is determined by the network security system 190 to not qualify for blocking or another security action based on the security policies, then the decrypted assertion is sent to the SP 702 at exchange 15.

At exchange 16, the ACS of the SP 702 verifies the assertion using the public key of the IDP 708, as it would have at exchange 9 in the case of a managed device. Further, the pages returned by the SP 702 at exchange 17 include a plurality of URLs, which are forwarded to the reverse proxy 180 by the network security system 190 at exchange 18. The reverse proxy 602 rewrites these URLs so that when the user 326 clicks on them, then instead of going directly to the SP 702, the user is tunneled through the network security system 190 for policy enforcement. This way, any subsequent traffic from the unmanaged device is mandatorily routed through the network security system 190.

Figure 9:
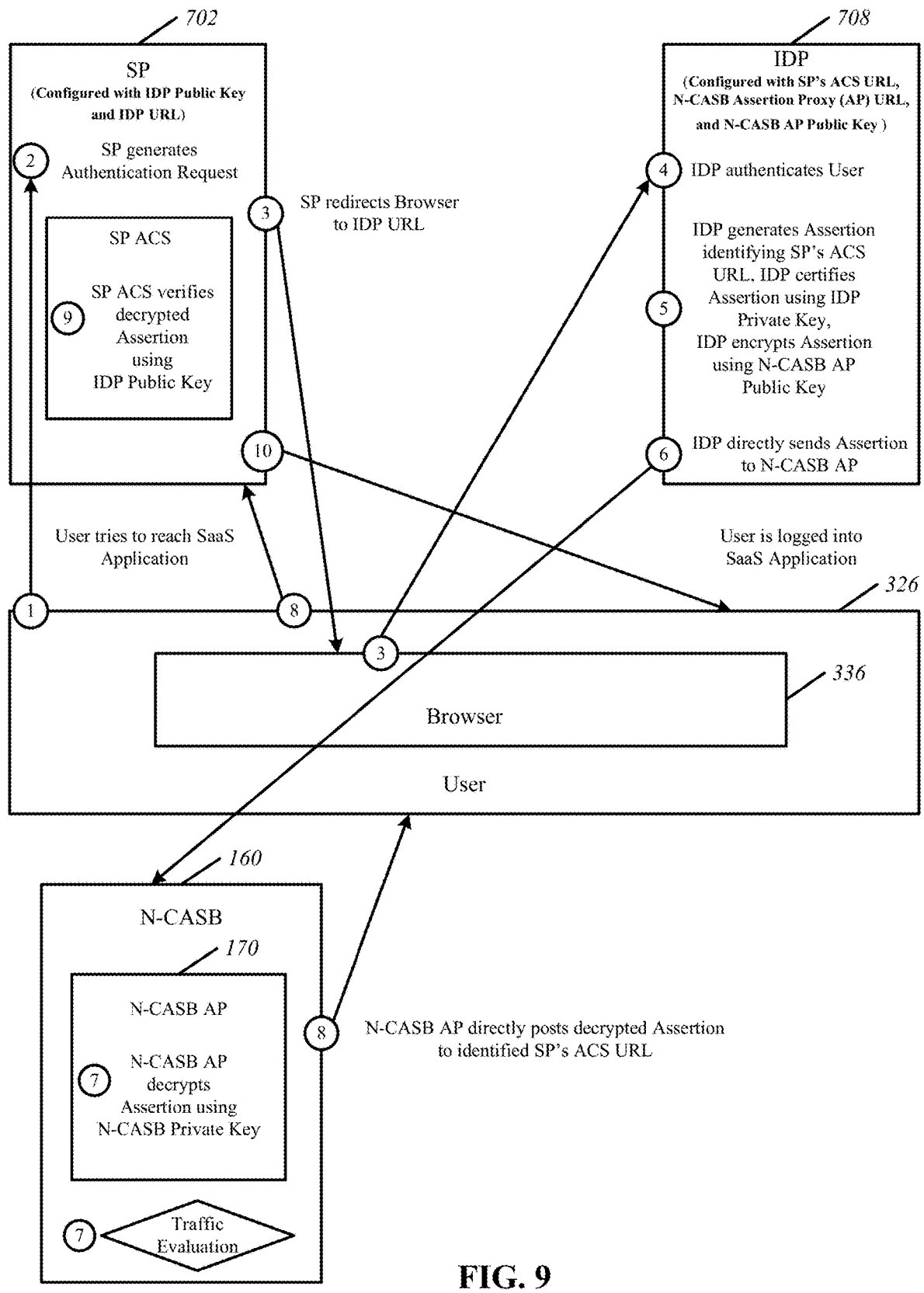
FIG. 9 shows another implementation of the trust relationship preservation during a federated SSO session by a N-CASB assertion proxy (AP).

FIG. 9 shows another implementation of the trust relationship preservation during a federated SSO session by the N-CASB assertion proxy (AP) 170. In particular, FIG. 9 shows one implementation of a message exchange chart of federated SSO based on WS-Federation protocol. In some implementations, WS-Federation is the federated SSO authentication method used in Microsoft products like Office 365™.

In FIG. 9, the configuration of the service provider, the identity provider, the N-CASB, and the N-CASB AP 170 mimics that of the SP 702, the IDP 708, the N-CASB 160, and the N-CASB 170 in FIG. 7, such that the trust relationship between the service provider and the identity provider is preserved, as discussed supra. Accordingly, the exchanges 1 to 5 and the exchanges 7 to 20 correspond directly with respective exchanges 1 to 5 and exchanges 7 to 20 in FIGS. 7-8. However, following the WS-Federation protocol, at exchange 6 in FIG. 9, the IDP 708 directly provides the certified and encrypted assertion to the N-CASB AP 170, without redirection to the browser 336. This is different from the SAML protocol where the certified and encrypted assertion is provided to the N-CASB AP 170 via the browser 336.

Figure 10:
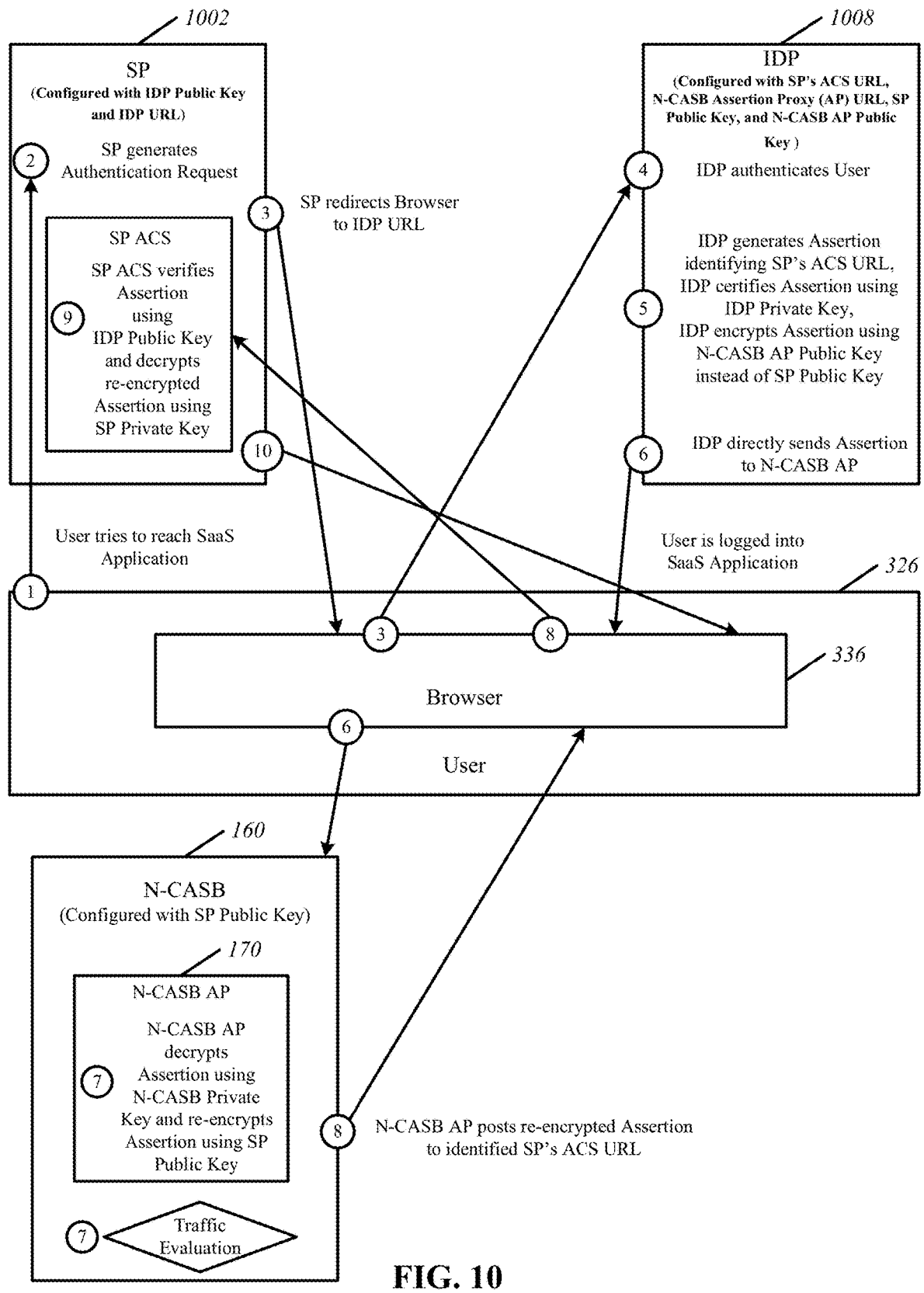
FIG. 10 shows one implementation of the trust relationship preservation during a federated SSO session by a N-CASB assertion proxy (AP).

FIG. 10 shows one implementation of the trust relationship preservation during a federated SSO session by the N-CASB assertion proxy (AP) 170. In particular, FIG. 10 shows one implementation of a message exchange chart of federated SSO based on SAML where the identity provider is configured to encrypt the assertion using a public key of the service provider. Such a configuration is common in certain SaaS applications such as Box™. The technology disclosed handles such configurations by using a "double encryption" technique where the IDP performs a first assertion encryption using a N-CASB public key instead of a SP public key, and the N-CASB AP 170 performs a second assertion encryption using the same SP public key configured at the IDP. Prior to the second assertion encryption, the N-CASB AP 170 decrypts the assertion using a N-CASB AP private key.

FIG. 10 includes a service provider (SP) 1002 and an identity provider (ID) 1008. In a separate off-line or out-of-band process, the SP 1002 is configured with a public key of the IDP 1008 and a URL of the IDP 1008. Also in a separate off-line or out-of-band process, the IDP 1008 is configured with an ACS URL of the SP 1002, a URL of the N-CASB AP 170, a public key of the SP 1002, and a public key of the N-CASB AP 170. Also in a separate off-line or out-of-band process, the N-CASB 170 is configured to share the same public key of the SP 1002 with the IDP 1008.

In FIG. 10, all communications between the SP 1002 and the IDP 1008 occur via the browser 336. At exchange 1, the user 326 tries to log in to the SaaS application represented by the SP 1002 or to any other resource or service hosted or provided by the SP 1002. However, before the user 326 is able to use services provided by the SP 1002, the "identity" of the user 326 must be provided by the IDP 1008, and authenticated and accepted by the SP 1002. This is what is meant by "authentication". In response, at exchange 2, the SP 1002 generates an authentication request, i.e. a "SAML request: which is forwarded to a URL of the IDP 1008. At exchange 3, the SP 1002 redirects the browser 336 to the URL of the IDP 1008. In other implementations, the redirection occurs via API calls from an application program of the user 326.

At exchange 4, the IDP 1008 authenticates the user 326, for example, by a multi-factor authentication mechanism or a previous IDP authentication session where the IDP 1008 is part of a larger trust relationship and where the user 326 already has an assertion provided to it from another IDP. Upon successful authentication of the user 326, the IDP 1008 generates an "assertion" or "SAML assertion" at exchange 5.

Within the assertion itself, the IDP 1008 identifies a destination/recipient URL. The IDP 1008 is configured to identify the destination/recipient URL as the ACS URL of the SP 1002. This IDP and assertion configuration is different from the IDP and assertion configuration implemented by existing CASBs, which change or modify the destination/recipient URL within the assertion to be the CASB URL or the reverse proxy URL, rather than be the SP ACS URL. According to some implementations, the technology disclosed achieves this by preventing the N-CASB 160 and/or the N-CASB AP 170 from accessing and modifying the contents of the assertion generated by the IDP 1008, such as modifying the destination/recipient URL of the assertion.

Once generated, the IDP 1008 certifies the assertion using an IDP private key and encrypts the certified assertion using the configured public key of the N-CASB AP 170, instead of using the configured public key of the SP 1008.

At exchange 6, the IDP 1008 forwards the encrypted and certified assertion to the N-CASB AP 170. Note that the posting of the encrypted and certified assertion to the N-CASB AP 170 is achieved without accessing or modifying the contents of the assertion generated by the IDP 1008. In particular, the posting occurs without changing or modifying a destination/recipient URL of the assertion. In one implementation, this is achieved by the off-line or out-of-band configuration of the IDP 1008 with a URL of the N-CASB AP 170, as discussed supra. This configuration ensures that the encrypted and certified assertion is posted to the N-CASB AP 170; thus, obviating the need to change or modify the destination/recipient URL within the assertion.

At exchange 7, the N-CASB AP 170 decrypts the encrypted assertion using a private key of the N-CASB AP 170 and re-encrypts the assertion using the same public key of the SP 1002 that it shares with the IDP 1008. Also at exchange 7, the N-CASB 160 or the N-CASB AP 170 evaluates the traffic to determine whether the traffic is routed from a managed device or an unmanaged device. If the traffic is routed from a managed device, then at exchange 8, the N-CASB AP 170 posts the decrypted assertion to the ACS URL of the SP 1002 identified within the assertion. Then, at exchange 10, the ACS of the SP 1002 verifies the decrypted assertion using the IDP public key. This is in contrast with existing CASBs, which, for the federated SSO authentication, use a CASB public key instead of the IDP public key and, as a result, modify the trust relationship between the SP and IDP.

Once the assertion is verified by the SP 1002, the user is logged in to the SaaS application at exchange 10.

In contrast, if at exchange 7, the N-CASB 160 or the N-CASB AP 170 determines that the traffic is routed from an unmanaged device, then, at exchange 10, the N-CASB 160 or the N-CASB AP 170 posts the decrypted assertion to a reverse proxy 180 via the browser 336, instead of posting it to the ACS of the SP 1002. Further processing of the re-encrypted assertion corresponds directly with respective exchanges 11 to 20 in FIG. 8.

Security Enforcement at the Assertion Proxy

In some implementations, one or more security policies can be enforced at the assertion proxy. One example includes allowing or blocking access to the requested service provider (SaaS application) based on information included in the assertion provided by the identity provider (IDaaS). In implementations, the assertion proxy can be configured with a public key of the identity provider to verify whether a received assertion was issued by the authorized identity provider or by an unauthorized, potentially malicious man-in-the-middle (MITM). Upon verification based on the public key of the identity provider, the assertion proxy can use the verified assertion to either allow or block access to the requested SaaS application.

Processes

Figure 11:
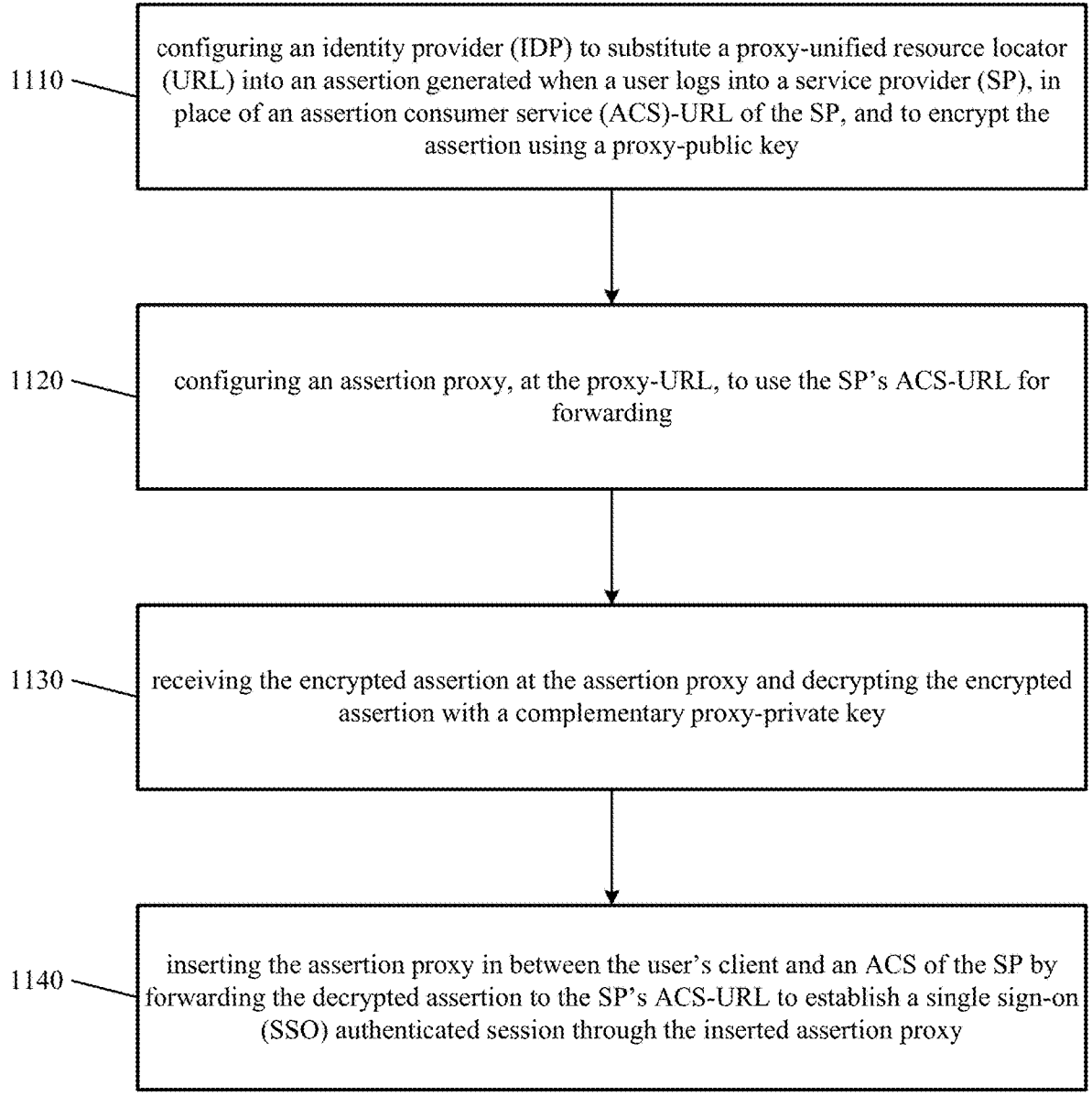
FIG. 11 depicts a representative method of non-intrusive security enforcement for federated single sign-on (SSO) authentication.

FIG. 11 depicts a representative method of non-intrusive security enforcement for federated single sign-on (SSO) authentication. In some implementations, the authentication is cloud-based federated single sign-on (SSO). Flowchart in FIG. 11 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

FIG. 11 includes a process that begins at action 1110 by configuring an identity provider (IDP) to use a proxy-unified resource locator (URL) for forwarding an assertion generated when a user logs into a service provider (SP), in place of an assertion consumer service (ACS)-URL of the SP, and to encrypt the assertion using a proxy-public key.

The SP and the IDP are in a trusted relationship established by configuring a SSO-unified resource locator (URL) and a public key of the IDP at the SP and configuring the SP's ACS-URL at the IDP and digitally certifying the generated assertion using an IDP-signature. The trust relationship between the SP and the IDP is preserved by maintaining the IDP-signature based digital certification of the generated assertion and validating the decrypted assertion at the SP using the IDP's public key to establish the federated SSO authenticated session.

In one implementation, the SP is a Software-as-a-Service (SaaS) application. In another implementation, the IDP is a third-party identity-as-a-service (IDaaS) used by an entity for the federated SSO authentication to the SP.

At action 1120, an assertion proxy is configured at the proxy-URL. The assertion proxy uses the SP's ACS-URL for forwarding. In one implementation, the assertion proxy is a cloud service hosted by a cloud access service broker (CASB). In another implementation, the assertion proxy is a local proxy hosted by a CASB on premise for the entity. In yet another implementation, the assertion proxy is different from the IDP and hosted by a CASB separate from an IDaaS hosting the IDP.

At action 1130, the encrypted assertion is received at the assertion proxy and decrypted with a complementary proxy-private key.

At action 1140, the assertion proxy is inserted in between the user's client and an ACS of the SP by forwarding the decrypted assertion to the SP's ACS-URL to establish a federated single sign-on (SSO) authenticated session through the inserted assertion proxy. In some implementations, a cloud-based federated single sign-on (SSO) authenticated session is established through the inserted assertion proxy.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as terminology, introduction, and system overview.

In one implementation, in response to determining that the user's client is an unmanaged device, the SP's ACS-URL is encoded with an added reverse proxy-domain at the inserted assertion proxy and the decrypted assertion is forwarded to a reverse proxy via the user's client. In some implementations, the unmanaged device is a Bring Your Own Device (BYOD) and/or an off-network device whose traffic is not being tunneled through a policy-enforcing server. Further, the reverse proxy strips the reverse proxy-domain and forwards the decrypted assertion to a network security system. The network security system evaluates the decrypted assertion based on or more security policies and forwards the evaluated assertion to the SP's ACS. Then, at the reverse proxy, the URLs contained in pages served by the SP are rewritten with rewritten URLs that redirect subsequent traffic from the user's client during the federated SSO authenticated session through the reverse proxy.

In one implementation, the assertion proxy and the reverse proxy are combined and hosted as a single proxy.

In some implementations, in response to determining that the user's client is an unmanaged device, access authorization of the user's client to the SP is blocked. In other implementations, in response to determining that the user's client is managed, the decrypted assertion is forwarded from the inserted assertion proxy to the SP's ACS via a network security system for establishing the federated SSO authenticated session. In yet other implementations, the decrypted assertion is evaluated at the reverse proxy based on one or more security policies and the evaluated assertion is forwarded to the SP's ACS.

In one implementation where the IDP uses a Security Assertion Markup Language (SAML) protocol, the encrypted assertion is received at the assertion proxy via the user's client. In another implementation where the IDP uses a Web Services (WS)-Federation protocol for active authentication, the encrypted assertion is received at the assertion proxy from the IDP. In such an implementation, the IDP is an Active Directory Federation Service (ADFS).

In some implementations, one or more IDPs are configured to use the proxy-URL, in place of ACS-URLs of multiples SPs, and to encrypt the assertions using the proxy-public key.

In some implementations, the IDP is configured to use the proxy-public key for encrypting the assertion, in place of the SP-public key. Also, the encrypted assertion is decrypted at the assertion proxy using the complementary proxy-private key, and the decrypted assertion is re-encrypted at the assertion proxy using the SP-public key. Then, the re-encrypted assertion is forwarded to the SP's ACS.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Figure 12:
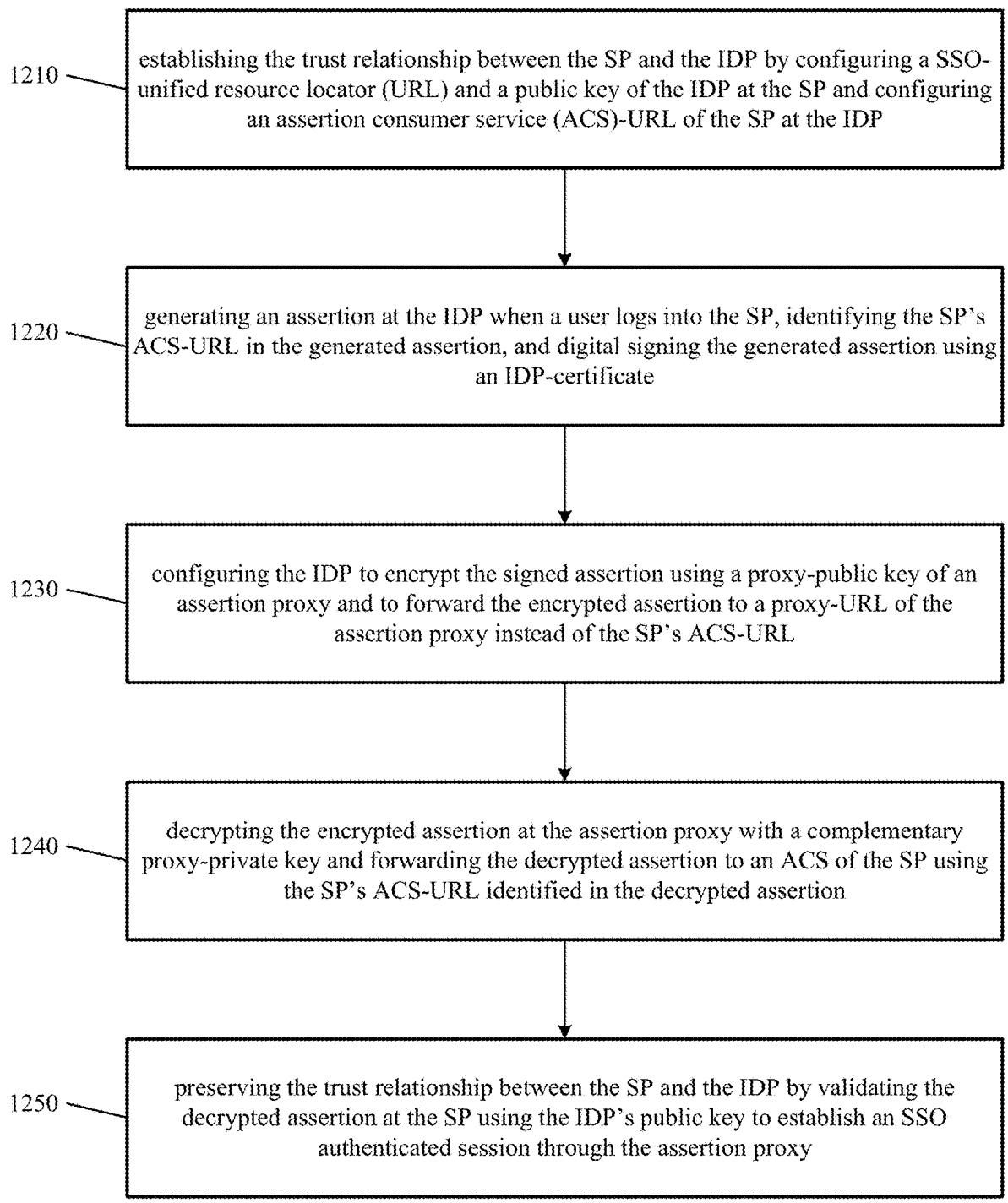
FIG. 12 is a flowchart showing a method of non-intrusively enforcing security during federated single sign-on (SSO) authentication without modifying a trust relationship between a service provider (SP) and an identity provider (IDP).

FIG. 12 is a flowchart showing a method of non-intrusively enforcing security during federated single sign-on (SSO) authentication without modifying a trust relationship between a service provider (SP) and an identity provider (IDP). In some implementations, the authentication is cloud-based federated single sign-on (SSO). Flowchart in FIG. 12 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 12. Multiple actions can be combined in some implementations. For convenience, this flowchart is described with reference to the system that carries out a method. The system is not necessarily part of the method.

FIG. 12 includes a process that begins at action 1210 where the trust relationship is established between the SP and the IDP by configuring a SSO-unified resource locator (URL) and a public key of the IDP at the SP and configuring an assertion consumer service (ACS)-URL of the SP at the IDP.

At action 1220, the method includes generating an assertion at the IDP when a user logs into the SP, identifying the SP's ACS-URL in the generated assertion, and digitally signing the generated assertion using an IDP-certificate.

At action 1230, the method includes configuring the IDP to encrypt the signed assertion using a proxy-public key of an assertion proxy and to forward the encrypted assertion to a proxy-URL of the assertion proxy instead of the SP's ACS-URL.

At action 1240, the method includes decrypting the encrypted assertion at the assertion proxy with a complementary proxy-private key and forwarding the decrypted assertion to an ACS of the SP using the SP's ACS-URL identified in the decrypted assertion.

At action 1250, the method includes preserving the trust relationship between the SP and the IDP by validating the decrypted assertion at the SP using the IDP's public key to establish a federated SSO authenticated session through the assertion proxy.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as terminology, introduction, and system overview.

In one implementation, in response to determining that the user's client is an unmanaged device, the SP's ACS-URL is encoded with an added reverse proxy-domain at the inserted assertion proxy and the decrypted assertion is forwarded to a reverse proxy via the user's client. In some implementations, the unmanaged device is a Bring Your Own Device (BYOD) and/or an off-network device whose traffic is not being tunneled through a policy-enforcing server. Further, the reverse proxy strips the reverse proxy-domain and forwards the decrypted assertion to a network security system. The network security system evaluates the decrypted assertion based on or more security policies and forwards the evaluated assertion to the SP's ACS. Then, at the reverse proxy, the URLs contained in pages served by the SP are rewritten with rewritten URLs that redirect subsequent traffic from the user's client during the federated SSO authenticated session through the reverse proxy.

In one implementation, the assertion proxy and the reverse proxy are combined and hosted as a single proxy.

In some implementations, in response to determining that the user's client is an unmanaged device, access authorization of the user's client to the SP is blocked. In other implementations, in response to determining that the user's client is managed, the decrypted assertion is forwarded from the inserted assertion proxy to the SP's ACS via a network security system for establishing the federated SSO authenticated session. In yet other implementations, the decrypted assertion is evaluated at the reverse proxy based on one or more security policies and the evaluated assertion is forwarded to the SP's ACS.

In one implementation where the IDP uses a Security Assertion Markup Language (SAML) protocol, the encrypted assertion is received at the assertion proxy via the user's client. In another implementation where the IDP uses a Web Services (WS)-Federation protocol for active authentication, the encrypted assertion is received at the assertion proxy from the IDP. In such an implementation, the IDP is an Active Directory Federation Service (ADFS).

In some implementations, one or more IDPs are configured to use the proxy-URL, in place of ACS-URLs of multiples SPs, and to encrypt the assertions using the proxy-public key.

In some implementations, the IDP is configured to use the proxy-public key for encrypting the assertion, in place of the SP-public key. Also, the encrypted assertion is decrypted at the assertion proxy using the complementary proxy-private key, and the decrypted assertion is re-encrypted at the assertion proxy using the SP-public key. Then, the re-encrypted assertion is forwarded to the SP's ACS.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Figure 13:
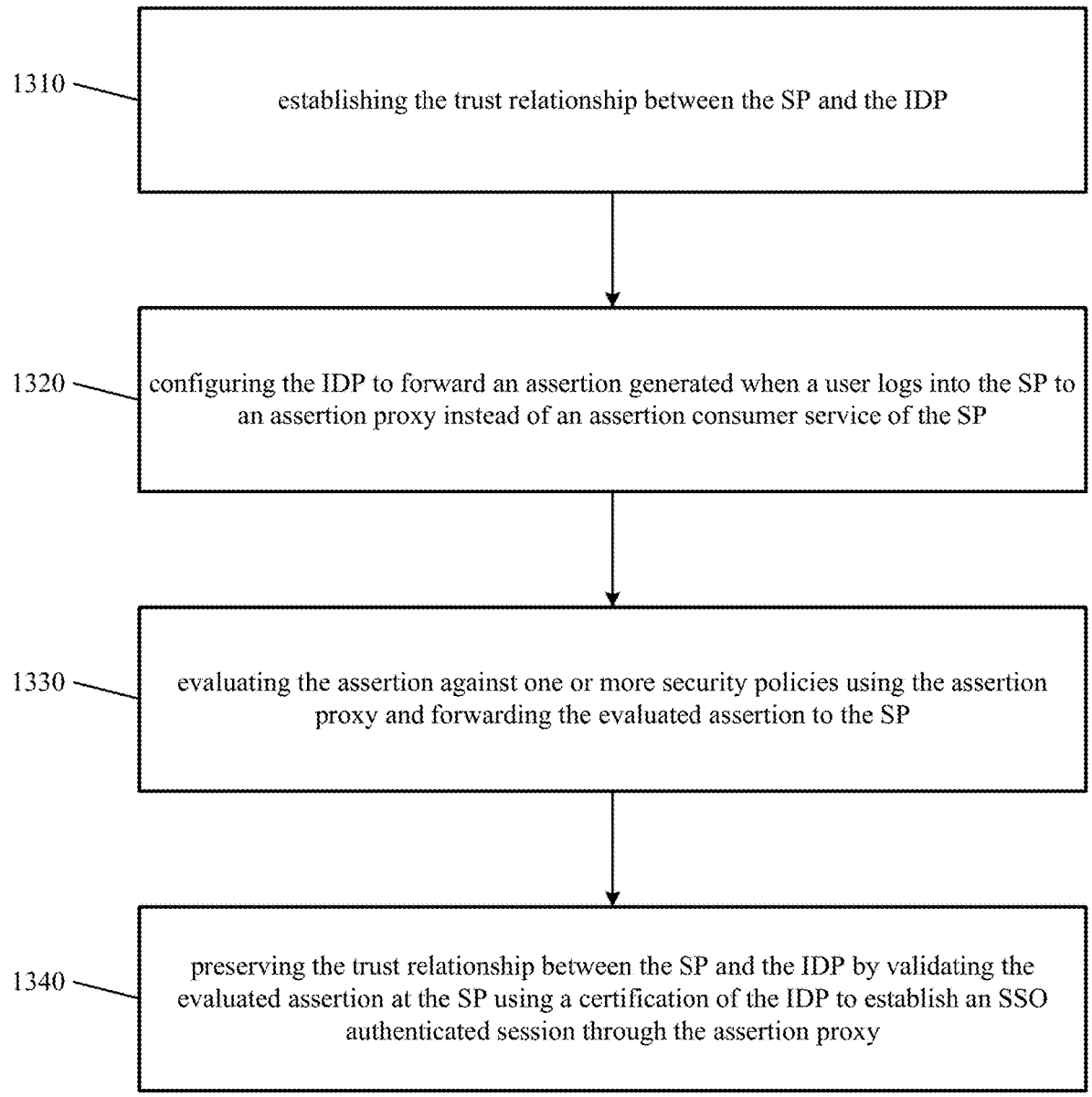
FIG. 13 is a flowchart showing a method of non-intrusively enforcing security during federated single sign-on (SSO) authentication without modifying a trust relationship between a service provider (SP) and an identity provider (IDP).

FIG. 13 is a flowchart showing a method of non-intrusively enforcing security during federated single sign-on (SSO) authentication without modifying a trust relationship between a service provider (SP) and an identity provider (IDP). In some implementations, the authentication is cloud-based federated single sign-on (SSO). Flowchart in FIG. 13 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 13. Multiple actions can be combined in some implementations. For convenience, this flowchart is described with reference to the system that carries out a method. The system is not necessarily part of the method.

FIG. 13 includes a process that begins at action 1310 where the trust relationship is established between the SP and the IDP.

At action 1320, the IDP is configured to forward an assertion generated when a user logs into the SP to an assertion proxy instead of an assertion consumer service of the SP.

At action 1330, the assertion is evaluated against one or more security policies using the assertion proxy and forwarding the evaluated assertion to the SP.

At action 1340, the trust relationship between the SP and the IDP is preserved by validating the evaluated assertion at the SP using a certification of the IDP to establish a federated SSO authenticated session through the assertion proxy.

Other implementations of the method described in this section can include a computer readable storage medium storing instructions in a non-transitory manner, which are executable by a processor to perform any of the methods described above. Yet another implementation of the method described in this section can include a system including memory and one or more processors operable to execute instructions, stored in the memory, to perform any of the methods described above.

Particular Implementations

We describe various implementations of preserving a trust relationship between a service provider (SP) and an identity provider (IDP) by non-intrusive security enforcement during federated single sign-on (SSO). In some implementations, the authentication is cloud-based federated single sign-on (SSO).

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A system implementation of the technology disclosed includes one or more processors coupled to memory. The memory is loaded with computer instructions which, when executed on the processors, cause non-intrusive security enforcement during federated single sign-on (SSO) authentication. The system includes an assertion proxy.

When a user logs into a service provider (SP), an assertion is generated. For forwarding the assertion, the system configures an identity provider (IDP) to use a proxy-unified resource locator (URL) in place of an assertion consumer service (ACS)-URL of the SP. The IDP is also configured to encrypt the assertion using a proxy-public key.

At the proxy-URL, the system configures the assertion proxy to use the SP's ACS-URL for forwarding. The assertion proxy can be a cloud service hosted by a cloud access service broker (CASB). The assertion proxy can also be a local proxy hosted by a CASB on premise for the entity. In implementations, the assertion proxy is different from the IDP and hosted by a CASB separate from an IDaaS hosting the IDP.

The assertion proxy then receives the encrypted assertion and decrypts the encrypted assertion with a complementary proxy-private key. The system inserts the assertion proxy in between the user's client and an ACS of the SP by forwarding the decrypted assertion to the SP's ACS-URL, which establishes a federated single sign-on (SSO) authenticated session through the inserted assertion proxy.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

The SP can be a Software-as-a-Service (SaaS) application. Examples of SP include Salesforce.com™, Box™, Dropbox™, Google Apps™, Amazon AWS™, Microsoft Office 365™, Workday™, Oracle on Demand™, Taleo™, Yammer™, and Concur™. The IDP can be a third-party identity-as-a-service (IDaaS) used by an entity for the federated SSO authentication to the SP. Examples of IDP include Okta™, Ping Identity™, Windows Azure Active Directory™, EmpowerID™, OneLogin™, Bitium™, Centrify™, Identacor™, and LastPass™.

The user's client can be an unmanaged device such as a Bring Your Own Device (BYOD) and/or an off-network device whose traffic is not being tunneled through a policy-enforcing server. When the system determines that the user's client is an unmanaged device, the SP's ACS-URL can be encoded with an added reverse proxy-domain at the inserted assertion proxy and the decrypted assertion can be forwarded to a reverse proxy via the user's client with a validation token. After the validation token is validated, the reverse proxy-domain can be stripped at the reverse proxy and the decrypted assertion can be forwarded to a network security system.

After that, the decrypted assertion can be evaluated at the network security system based on one or more security policies and the evaluated assertion can be forwarded to the SP's ACS. Finally, the reverse proxy can rewrite URLs contained in pages served by the SP with rewritten URLs that redirect subsequent traffic from the user's client during the federated SSO authenticated session through the reverse proxy.

Additionally, in response to determining that the user's client is an unmanaged device, the system can block access authorization of the user's client to the SP.

In response to determining that the user's client is managed, the decrypted assertion can be forwarded from the inserted assertion proxy to the SP's ACS via a network security system for establishing the federated SSO authenticated session.

The decrypted assertion can be evaluated at the reverse proxy based on one or more security policies and forwarded to the SP's ACS.

The assertion proxy and the reverse proxy can be combined and hosted as a single proxy, according to some implementations.

The security policies can be enforced at the assertion proxy, in addition to or instead of the reverse proxy. Such an implementation obviates the need of a reverse proxy. Security enforcement includes allowing or blocking access to the SP based on IDP provided information in the assertion and verification of IDP's identity by the assertion proxy in dependence upon the IDP's public key configured at the assertion proxy.

The IDP can use a Security Assertion Markup Language (SAML) protocol. In such implementations, the encrypted assertion is received at the assertion proxy via the user's client, according to some implementations. The IDP can also use a Web Services (WS)-Federation protocol for active authentication. In such implementations, the encrypted assertion is received at the assertion proxy from the IDP, bypassing the user's client. The IDP can also use Active Directory Federation Service (ADFS).

The trust relationship between the SP and the IDP can be established by configuring a SSO-unified resource locator (URL) and a public key of the IDP at the SP, configuring the SP's ACS-URL at the IDP, and digitally certifying the generated assertion using an IDP-signature. The trust relationship between the SP and the IDP can be preserved by maintaining the IDP-signature based digital certification of the generated assertion and validating the decrypted assertion at the SP using the IDP's public key to establish the federated SSO authenticated session.

The system can configure one or more IDPs to use the proxy-URL, in place of ACS-URLs of multiples SPs, and to encrypt the assertions using the proxy-public key.

The system can also re-encrypt the decrypted assertion at the assertion proxy using a public key of the SP and forward the re-encrypted assertion to ACS of the SP.

Other implementations may include a non-transitory computer readable storage medium storing instructions executable by a processor to perform functions of the system described above. Yet another implementation may include a method performing the functions of the system described above.

Another system implementation of the technology disclosed includes one or more processors coupled to memory. The memory is loaded with computer instructions which, when executed on the processors, cause double encryption during federated single sign-on (SSO) authentication. The system includes an assertion proxy.

The system configures an identity provider (IDP) to encrypt an assertion using a public key of an assertion proxy, instead of a public key of a service provider (SP).

The system decrypts the encrypted assertion at the assertion proxy using a complementary private key of the assertion proxy.

The system re-encrypts the decrypted assertion at the assertion proxy using the public key of the SP and forwards the re-encrypted assertion to an assertion consumer service (ACS) of the SP.

Other implementations may include a non-transitory computer readable storage medium storing instructions executable by a processor to perform functions of the system described above. Yet another implementation may include a method performing the functions of the system described above.

Another system implementation of the technology disclosed includes one or more processors coupled to memory. The memory is loaded with computer instructions which, when executed on the processors, cause non-intrusive security enforcement during federated single sign-on (SSO) authentication without modifying a trust relationship between a service provider (SP) and an identity provider (IDP). The system includes an assertion proxy.

First, the trust relationship between the SP and the IDP is established by configuring a SSO-unified resource locator (URL) and a public key of the IDP at the SP and configuring an assertion consumer service (ACS)-URL of the SP at the IDP. When a user logs into the SP, an assertion is generated at the IDP. The SP's ACS-URL is identified in the generated assertion. The generated assertion is then digitally signed using an IDP-certificate.

The system then configures the IDP to encrypt the signed assertion using a proxy-public key of the assertion proxy and to forward the encrypted assertion to a proxy-URL of the assertion proxy instead of the SP's ACS-URL.

Following this, the encrypted assertion is decrypted at the assertion proxy with a complementary proxy-private key and the decrypted assertion is forwarded to an ACS of the SP using the SP's ACS-URL identified in the decrypted assertion.

Finally, the trust relationship between the SP and the IDP is preserved by validating the decrypted assertion at the SP using the IDP's public key to establish a federated SSO authenticated session through the assertion proxy.

Each of the features discussed in this particular implementation section for the first system implementation apply equally to this system implementation. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

Yet another system implementation of the technology disclosed includes one or more processors coupled to memory. The memory is loaded with computer instructions which, when executed on the processors, cause non-intrusive security enforcement during federated single sign-on (SSO) authentication without modifying a trust relationship between a service provider (SP) and an identity provider (IDP). The system includes an assertion proxy.

First, the trust relationship between the SP and the IDP is established.

Then, the system configures the IDP to forward an assertion generated when a user logs into the SP to the assertion proxy instead of an assertion consumer service (ACS) of the SP.

Following this, the assertion is evaluated against one or more security policies using the assertion proxy and forwarded to the SP.

Finally, the trust relationship between the SP and the IDP is preserved by validating the evaluated assertion at the SP using a certification of the IDP to establish a federated SSO authenticated session through the assertion proxy.

Each of the features discussed in this particular implementation section for the first system implementation apply equally to this system implementation. As indicated above, all the system features are not repeated here and should be considered repeated by reference.

Other implementations may include a non-transitory computer readable storage medium storing instructions executable by a processor to perform functions of the system described above. Yet another implementation may include a method performing the functions of the system described above.

A method implementation of the technology disclosed includes non-intrusive security enforcement for federated single sign-on (SSO) authentication. The method includes configuring an identity provider (IDP) to use a proxy-unified resource locator (URL) for forwarding an assertion generated when a user logs into a service provider (SP), in place of an assertion consumer service (ACS)-URL of the SP, and to encrypt the assertion using a proxy-public key.

The method proceeds to configuring an assertion proxy, at the proxy-URL, to use the SP's ACS-URL for forwarding.

Then, the method includes receiving the encrypted assertion at the assertion proxy and decrypting the encrypted assertion with a complementary proxy-private key.

Finally, the method includes inserting the assertion proxy in between the user's client and an ACS of the SP by forwarding the decrypted assertion to the SP's ACS-URL to establish a federated single sign-on (SSO) authenticated session through the inserted assertion proxy.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Another method implementation of the technology disclosed includes non-intrusively enforcing security during federated single sign-on (SSO) authentication without modifying a trust relationship between a service provider (SP) and an identity provider (IDP). The method includes establishing the trust relationship between the SP and the IDP by configuring a SSO-unified resource locator (URL) and a public key of the IDP at the SP and configuring an assertion consumer service (ACS)-URL of the SP at the IDP.

The method proceeds to generating an assertion at the IDP when a user logs into the SP, identifying the SP's ACS-URL in the generated assertion, and digitally signing the generated assertion using an IDP-certificate.

Following this, the method includes configuring the IDP to encrypt the signed assertion using a proxy-public key of an assertion proxy and to forward the encrypted assertion to a proxy-URL of the assertion proxy instead of the SP's ACS-URL.

Then, the method includes decrypting the encrypted assertion at the assertion proxy with a complementary proxy-private key and forwarding the decrypted assertion to an ACS of the SP using the SP's ACS-URL identified in the decrypted assertion.

Finally, the method includes preserving the trust relationship between the SP and the IDP by validating the decrypted assertion at the SP using the IDP's public key to establish a federated SSO authenticated session through the assertion proxy.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Yet another method implementation of the technology disclosed includes non-intrusively enforcing security during federated single sign-on (SSO) authentication without modifying a trust relationship between a service provider (SP) and an identity provider (IDP).

First, the method includes establishing the trust relationship between the SP and the IDP.

The method proceeds to configuring the IDP to forward an assertion generated when a user logs into the SP to an assertion proxy instead of an assertion consumer service of the SP.

Following this, the method includes evaluating the assertion against one or more security policies using the assertion proxy and forwarding the evaluated assertion to the SP.

Finally, the method includes preserving the trust relationship between the SP and the IDP by validating the evaluated assertion at the SP using a certification of the IDP to establish a federated SSO authenticated session through the assertion proxy.

Each of the features discussed in this particular implementation section for the first system implementation apply equally to this method implementation. As indicated above, all the system features are not repeated here and should be considered repeated by reference.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Computer readable media (CRM) implementations the technology disclosed include a non-transitory computer readable storage medium impressed with computer program instructions, when executed on a processor, implement the methods described above.

Each of the features discussed in this particular implementation section for the first system implementation apply equally to the CRM implementation. As indicated above, all the system features are not repeated here and should be considered repeated by reference.

Computer System

Figure 14:
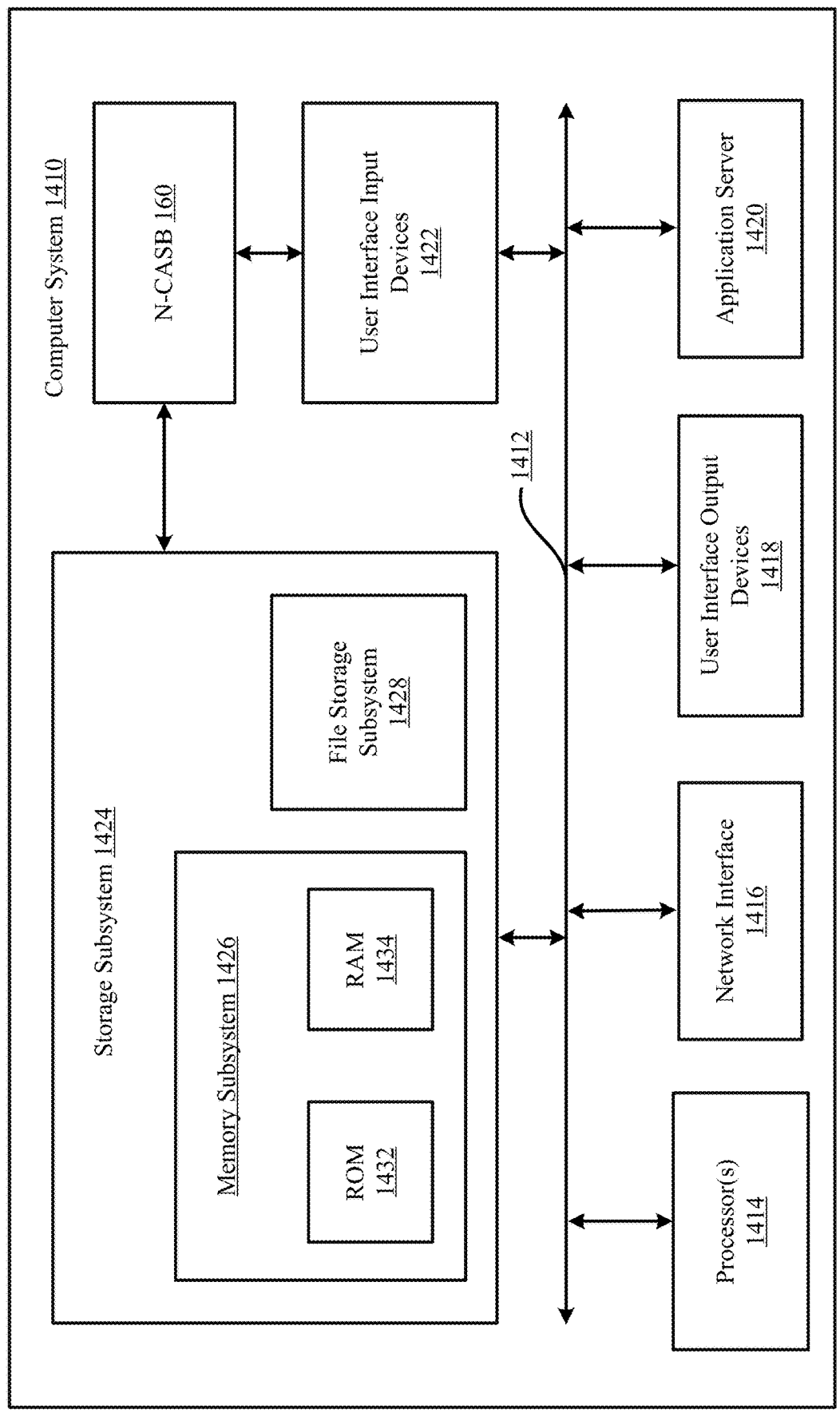
FIG. 14 is a simplified block diagram of a computer system that can be used to implement the technology disclosed.

FIG. 14 is a simplified block diagram of a computer system that can be used to implement the technology disclosed. Computer system 1410 typically includes at least one processor 1414 that communicates with a number of peripheral devices via bus subsystem 1412. These peripheral devices can include a storage subsystem 1424 including, for example, memory devices and a file storage subsystem, user interface input devices 1422, user interface output devices 1418, and a network interface subsystem 1416. The input and output devices allow user interaction with computer system 1410. Network interface subsystem 1416 provides an interface to outside networks, including an interface to corresponding interface devices in other computer systems.

In one implementation, the N-CASB 160 is communicably linked to the storage subsystem 1424 and a user interface input devices 1422.

User interface input devices 1422 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1410.

User interface output devices 1418 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1410 to the user or to another machine or computer system.

Storage subsystem 1424 stores programming and data constructs that provide the functionality of some or all of the modules and methods described herein. These software modules are generally executed by processor 1414 alone or in combination with other processors.

Memory 1426 used in the storage subsystem can include a number of memories including a main random access memory (RAM) 1434 for storage of instructions and data during program execution and a read only memory (ROM) 1432 in which fixed instructions are stored. A file storage subsystem 1428 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1428 in the storage subsystem 1424, or in other machines accessible by the processor.

Bus subsystem 1412 provides a mechanism for letting the various components and subsystems of computer system 1410 communicate with each other as intended. Although bus subsystem 1412 is shown schematically as a single bus, alternative implementations of the bus subsystem can use multiple busses. Application server 1420 can be a framework that allows the applications of computer system 1410 to run, such as the hardware and/or software, e.g., the operating system.

Computer system 1410 can be of varying types including a workstation, server, computing cluster, blade server, server farm, or any other data processing system or computing device. Due to the ever-changing nature of computers and networks, the description of computer system 1410 depicted in FIG. 14 is intended only as one example. Many other configurations of computer system 1410 are possible having more or fewer components than the computer system depicted in FIG. 14.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL™ non-relational database implementation such as a Vampire™ compatible non-relational database implementation, an Apache Cassandra™ compatible non-relational database implementation, a Big-Table™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Apache Storm™, Apache Spark™, Apache Kafka™, Apache Flink™, Truviso™, Amazon Elasticsearch Service™, Amazon Web Services™ (AWS), IBM Info-Sphere™, Borealis™, and Yahoo! S4™.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A system, comprising:
    a processor coupled to a memory storing instructions for managing a trust relationship between an assertion proxy, an identity provider (IDP) and a service provider (SP) that when executed by the processor implement an assertion proxy hosted by a cloud access service broker (CASB) separately from service providers and identity service providers providing SSO authentication to service providers, the assertion proxy configured to
        receive, from an identity provider (IDP), a verified assertion obtained from an assertion that is generated when a user logs into a service provider (SP) and is verified in dependence upon the IDP's public key;
        evaluate the verified assertion against one or more security policies; and
        forwarding the verified assertion evaluated to the SP and causing establishment of a single sign-on (SSO) authenticated session without modifying the assertion; thereby allowing or blocking access to the SP based on information in the verified assertion evaluated.

2. The system of claim 1, wherein allowing access to the SP includes the assertion proxy forwarding the verified assertion evaluated to the SP and causing establishment of a single sign-on (SSO) authenticated session.

3. The system of claim 1, wherein the IDP is a third-party identity-as-a-service (IDaaS) used by an entity for the SSO authentication to the SP.

4. The system of claim 3, wherein the assertion proxy is a local proxy hosted by a CASB on premise for the entity.

5. The system of claim 1, wherein the assertion proxy is a cloud service hosted by a cloud access service broker (CASB).

6. The system of claim 1, wherein the assertion proxy is different from the IDP and hosted by a CASB separate from an IDaaS hosting the IDP.

7. The system of claim 1, wherein the SP is a cloud application.

8. A computer-implemented method, including:
an assertion proxy receiving, from an identity provider (IDP), a verified assertion obtained from an assertion that is generated when a user logs into a service provider (SP) and is verified in dependence upon the IDP's public key; wherein the assertion proxy is hosted by a cloud access service broker (CASB) separately from service providers and identity service providers providing SSO authentication to service providers;
the assertion proxy evaluating the verified assertion against one or more security policies; and
the assertion proxy forwarding the verified assertion evaluated to the SP and causing establishment of a single sign-on (SSO) authenticated session without modifying the assertion; thereby allowing or blocking access to the SP based on information in the verified assertion evaluated.

9. The computer-implemented method of claim 8, wherein the assertion proxy allows access to the SP by forwarding the verified assertion evaluated to the SP and causing establishment of a single sign-on (SSO) authenticated session.

10. The computer-implemented method of claim 9, wherein the IDP is a third-party identity-as-a-service (IDaaS) used by an entity for the SSO authentication to the SP.

11. The computer-implemented method of claim 10, wherein the assertion proxy is a cloud service hosted by a cloud access service broker (CASB).

12. The computer-implemented method of claim 10, wherein the assertion proxy is different from the IDP and hosted by a CASB separate from an IDaaS hosting the IDP.

13. The computer-implemented method of claim 10, wherein the assertion proxy is a local proxy hosted by a CASB on premise for the entity.

14. The computer-implemented method of claim 8, wherein the SP is a cloud application.

15. A non-transitory computer readable storage medium impressed with computer program instructions for managing a trust relationship between an assertion proxy, an identity provider (IDP) and a service provider (SP), which instructions, when executed on a processor, implement a method comprising:
an assertion proxy receiving, from an identity provider (IDP), a verified assertion obtained from an assertion that is generated when a user logs into a service provider (SP) and is verified in dependence upon the IDP's public key; wherein the assertion proxy is hosted by a cloud access service broker (CASB) separately from service providers and identity service providers providing SSO authentication to service providers;
the assertion proxy evaluating the verified assertion against one or more security policies; and
the assertion proxy forwarding the verified assertion evaluated to the SP and causing establishment of a single sign-on (SSO) authenticated session without modifying the assertion; thereby allowing or blocking access to the SP based on information in the verified assertion evaluated.

16. The non-transitory computer readable storage medium of claim 15, wherein the assertion proxy allows access to the SP by forwarding the verified assertion evaluated to the SP and causing establishment of a single sign-on (SSO) authenticated session.

17. The non-transitory computer readable storage medium of claim 16, wherein the IDP is a third-party identity-as-a-service (IDaaS) used by an entity for the SSO authentication to the SP.

18. The non-transitory computer readable storage medium of claim 17, wherein the assertion proxy is a cloud service hosted by a cloud access service broker (CASB).

19. The non-transitory computer readable storage medium of claim 17, wherein the assertion proxy is different from the IDP and hosted by a CASB separate from an IDaaS hosting the IDP.

20. The non-transitory computer readable storage medium of claim 17, wherein the assertion proxy is a local proxy hosted by a CASB on premise for the entity.

* * * * *